United States Patent
Wakui

(10) Patent No.: US 9,894,245 B2
(45) Date of Patent: Feb. 13, 2018

(54) IMAGE PROCESSING DEVICE INCLUDING IMAGE SIZE ADJUSTMENT UNIT

(71) Applicant: FUJIFILM Corporation, Tokyo (JP)

(72) Inventor: Takashi Wakui, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/408,249

(22) Filed: Jan. 17, 2017

(65) Prior Publication Data

US 2017/0126930 A1 May 4, 2017

Related U.S. Application Data

(63) Continuation of application No. 15/078,971, filed on Mar. 23, 2016, now Pat. No. 9,571,695, which is a
(Continued)

(30) Foreign Application Priority Data

Oct. 4, 2013 (JP) ................................ 2013-209478

(51) Int. Cl.
*H04N 1/405* (2006.01)
*H04N 1/393* (2006.01)
(Continued)

(52) U.S. Cl.
CPC ....... *H04N 1/4051* (2013.01); *G06K 15/1843* (2013.01); *G06K 15/1876* (2013.01);
(Continued)

(58) Field of Classification Search
None
See application file for complete search history.

(56) References Cited

U.S. PATENT DOCUMENTS 6,166,751 A 12/2000 Yamada
7,809,201 B2 10/2010 Yoshida
(Continued)

FOREIGN PATENT DOCUMENTS

EP 1 257 113 A2 11/2002
JP H09-123524 A 5/1997
(Continued)

OTHER PUBLICATIONS

United States Notice of Allowance dated Oct. 3, 2016 in U.S. Appl. No. 15/078,971.
(Continued)

*Primary Examiner* — Scott A Rogers
(74) *Attorney, Agent, or Firm* — McGinn I.P. Law Group, PLLC

(57) ABSTRACT

An image processing device which generates a halftone image includes: an image size adjustment unit which adjusts a size of the input image; and a halftone processing unit which performs halftone processing on the input image size-adjusted to generate a halftone image, wherein: the image size adjustment unit adjusts the input image to a same size in two or more printing modes among the plurality of printing modes, and the input image of the same size is subjected to the halftone processing; the unit limits arrangement of dots constituting the halftone image to dot arrangeable places of a selected printing mode among the plurality of printing modes, and performs the halftone processing based on an error diffusion method using an error diffusion coefficient matrix according to the selected printing mode; and the functions performed by the image size adjustment unit and the halftone processing unit are achieved using a computer.

20 Claims, 18 Drawing Sheets

Related U.S. Application Data continuation of application No. PCT/JP2014/076546, filed on Oct. 3, 2014.

(51) Int. Cl.
*G06K 15/02* (2006.01)
*H04N 1/23* (2006.01)
*H04N 1/40* (2006.01)

(52) U.S. Cl.
CPC ....... *G06K 15/1881* (2013.01); *H04N 1/2369* (2013.01); *H04N 1/3935* (2013.01); *H04N 1/4052* (2013.01); *H04N 1/40068* (2013.01); *G06K 2215/0057* (2013.01); *G06K 2215/0094* (2013.01)

(56) References Cited

U.S. PATENT DOCUMENTS

| 8,130,410 | B2 | 3/2012 | Gotoh |
| 2006/0001894 | A1 | 1/2006 | Fujimori |
| 2006/0007494 | A1 | 1/2006 | Fujimori |
| 2006/0262329 | A1 | 11/2006 | Fujimori |

FOREIGN PATENT DOCUMENTS

| JP | H 11-110150 A | 4/1999 |
| JP | 2001-053957 A | 2/2001 |
| JP | 2002-135583 A | 5/2002 |
| JP | 2006-014131 A | 1/2006 |
| JP | 2006-033006 A | 2/2006 |
| JP | 2006-186755 A | 7/2006 |
| JP | 2012-028953 A | 2/2012 |
| JP | 2012-134968 A | 7/2012 |

OTHER PUBLICATIONS

United States Non-Final dated Jun. 9, 2016 in U.S. Appl. No. 15/078,971.
International Search Report (ISR) (PCT Form PCT/ISA/210), in PCT/JP2014/076546, dated Jan. 6, 2015.
The Written Opinion of the International Searching Authority (Form PCT/ISA/237) (with English translation thereof) dated Jan. 6, 2015.
Japanese Office Action dated Nov. 22, 2016 in Japanese Application No. 2013-209478 with an English translation.
Extended European Search Report dated Nov. 8, 2016 in European Application No. 14850838.5-1902.
Japanese Office Action dated Sep. 9, 2016 with a partial English translation thereof.

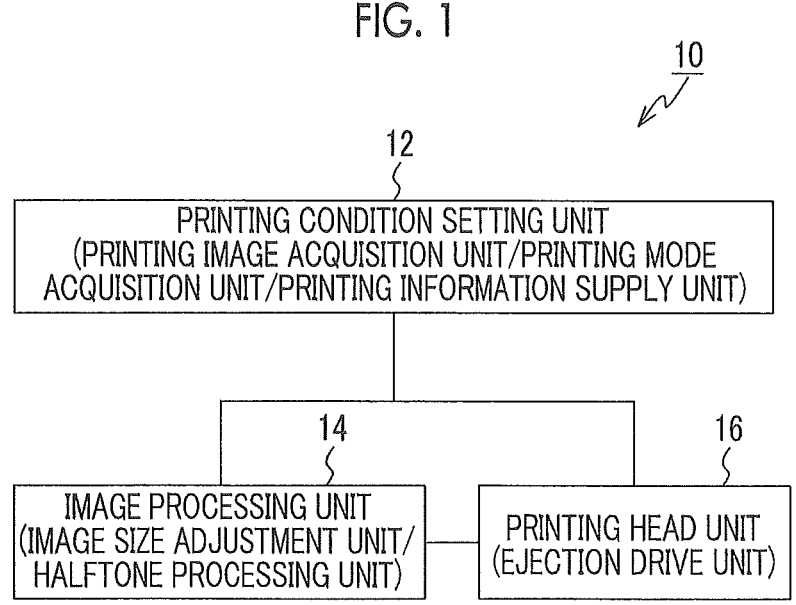
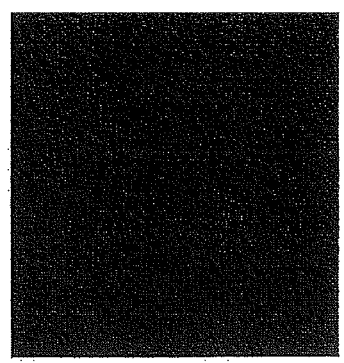
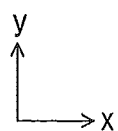

1200dpi × 600dpi
(LINEAR ARRANGEMENT)

1200dpi × 600dpi
(ZIGZAG ARRANGEMENT)

600dpi × 600dpi
(LATTICE ARRANGEMENT)

600dpi × 600dpi
(HEXAGONAL ARRANGEMENT)

600dpi × 600dpi
(TRIANGULAR ARRANGEMENT)

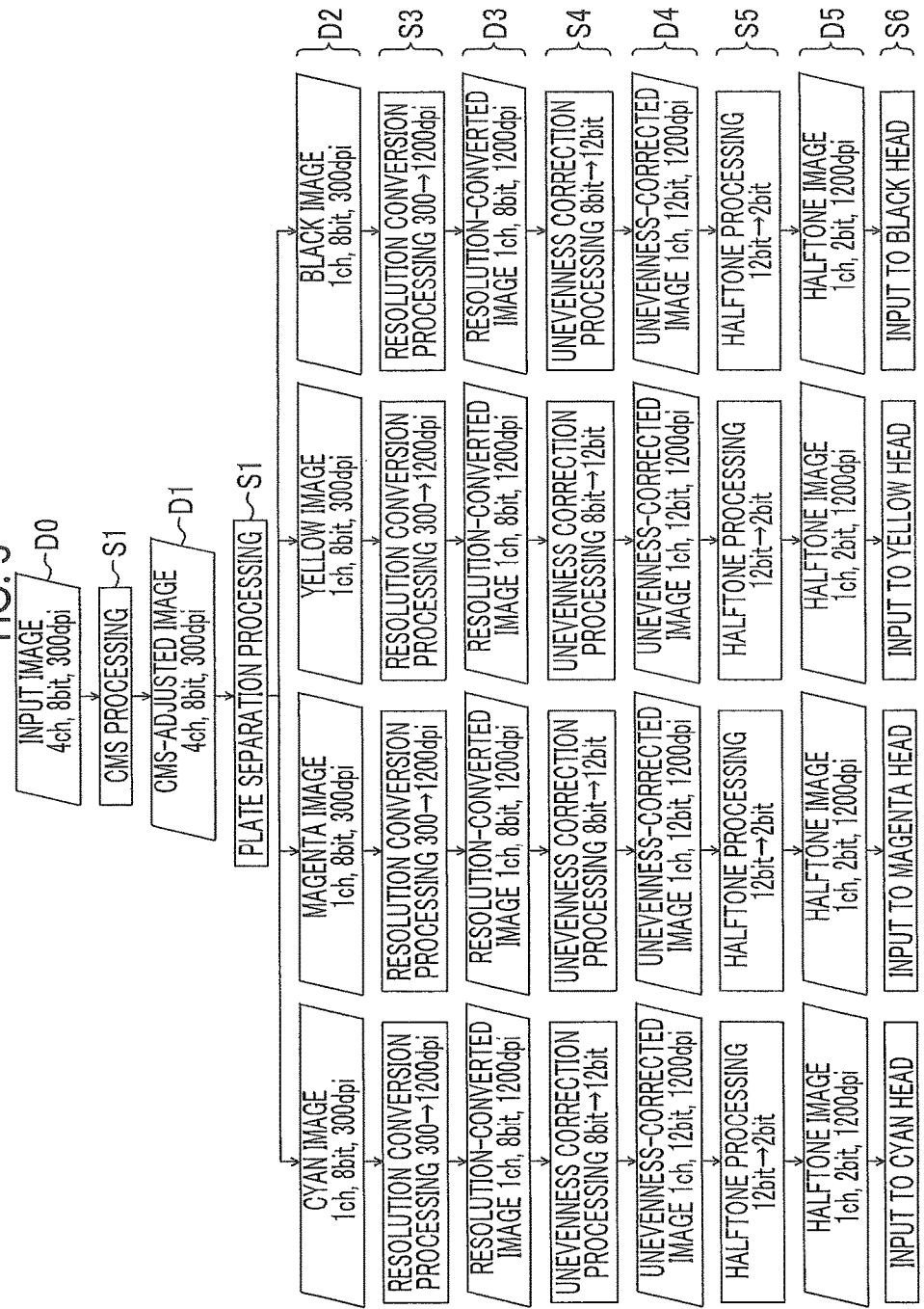

BINARIZATION THRESHOLD: 0
DOT RATIO: 0%

BINARIZATION THRESHOLD: 491
DOT RATIO: 12%

M

BINARIZATION THRESHOLD: 1024
DOT RATIO: 25%

M

BINARIZATION THRESHOLD: 2048
DOT RATIO: 50%

M

BINARIZATION THRESHOLD: 2580
DOT RATIO: 63%

M

BINARIZATION THRESHOLD: 3072
DOT RATIO: 75%

M

BINARIZATION THRESHOLD: 3850
DOT RATIO: 94%

M

BINARIZATION THRESHOLD: 4095
DOT RATIO: 100%

M

M
BINARIZATION THRESHOLD: 0
DOT RATIO: 0%

M

BINARIZATION THRESHOLD: 1024
DOT RATIO: 12%

M

BINARIZATION THRESHOLD: 2048
DOT RATIO: 25%

M

BINARIZATION THRESHOLD: 4094
DOT RATIO: 50%

M

BINARIZATION THRESHOLD: 4095
DOT RATIO: 100%

FIG. 14

```
h: IMAGE HEIGHT
w: IMAGE WIDTH
k: DOT DIAMETER TYPE
src: INPUT IMAGE
err: DIFFUSION ERROR
dot: DOT AMOUNT
mask: DOT ARRANGEMENT MASK
edfmatH: ERROR DIFFUSION COEFFICIENT MATRIX WIDTH
edfmatW: ERROR DIFFUSION COEFFICIENT MATRIX WIDTH
edfmat: ERROR DIFFUSION COEFFICIENT MATRIX 10    for (int i=0; i<h; i++){
20     for (int j=0; j<w; j++){
30       // ERROR CALCULATION
40       val = src[i,j] + err [i,j]
50       // BINARIZATION
60       k = thresh(val)
70       newErr = val - dot[k]
80       // DIFFUSION OF ERROR
90       for( int n=0; n<edfmatH; n++){
100        for( int m=0; m<edfmatW; m++){
110          // IF MASK IS ON, DIFFUSE ERROR
120          if ( mask[i+n,j+m]=ON){
130            err[i+n,j+m]+=newErr * edfmat[n,m]
140          }
150        }
160      }
170    }
```

FIG. 15A

FIG. 16

```
h: IMAGE HEIGHT
w: IMAGE WIDTH
k: DOT DIAMETER TYPE
src: INPUT IMAGE
err: DIFFUSION ERROR
dot: DOT AMOUNT
mask: DOT ARRANGEMENT MASK
edfmatH: ERROR DIFFUSION COEFFICIENT MATRIX WIDTH
edfmatW: ERROR DIFFUSION COEFFICIENT MATRIX WIDTH
edfmat: ERROR DIFFUSION COEFFICIENT MATRIX 10    for (int i=0; i<h; i++){
20     for (int j=0; i<w; j++){
30        // ERROR CALCULATION
40        val = src[i,j] + err [i,j]
50        // BINARIZATION
60        k = thresh(val)
70        newErr = val - dot[k]
80        // DIFFUSION OF ERROR
90        for( int n=0; n<edfmatH; n++){
100          for( int m=0; m<edfmatW; m++){
110             err[i+n,j+m]+=newErr * edfmat[n,m]
120          }
130       }
140   }
```

IMAGE PROCESSING DEVICE INCLUDING IMAGE SIZE ADJUSTMENT UNIT

CROSS-REFERENCE TO RELATED APPLICATIONS

The present application is a Continuation Application of U.S. patent application Ser. No. 15/078,971, filed on Mar. 23, 2016, which is a Continuation of PCT International Application No. PCT/JP2014/076546 filed on Oct. 3, 2014 claiming priority under 35 U.S.C §119(a) to Japanese Patent Application No. 2013-209478 filed on Oct. 4, 2013. Each of the above applications is hereby expressly incorporated by reference, in their entirety, into the present application.

BACKGROUND OF THE INVENTION

1. Field of the Invention

The present invention relates to an image processing method in a printing device using a plurality of printing modes with different definition, and in particular, a technique for simplifying image processing including halftone processing.

2. Description of the Related Art

A printer which can change output resolution by switching a printing system without changing a mechanism, such as a printing head, is known, and printing can be performed with resolution of, for example, "1200 dpi (dots per inch)× 1200 dpi", "1200 dpi×600 dpi", "600 dpi×600 dpi", and the like. Furthermore, a dot arrangement form as well as resolution can be changed, and printing can be performed in printing modes of various dot arrangement forms (for example, lattice arrangement, zigzag arrangement, and the like).

On the other hand, from the input of image data until printing is performed, there are various kinds of image processing, such as color conversion processing, resolution conversion processing, plate separation processing, unevenness correction processing, and halftone processing. Through a series of image processing based on a printing mode, a desired image is recorded on a printing medium, such as a recording sheet.

JP2012-134968A discloses an image processing device which faithfully reproduces input image data having pixels arranged in a lattice shape with zigzag recording. In the image processing device, a plurality of consecutive pixels in input image data in a direction of reducing the amount of information by half are set as one conversion unit of resolution conversion, the position of the conversion unit matches the phase of zigzag recording, and resolution conversion is performed while shifting between an odd-numbered column and an even-numbered column in input image data in a direction of maintaining the amount of information.

JP2006-186755A discloses an image processing device which reduces storage capacity as a whole. The image processing device includes a module which performs different halftone processing for each of a plurality of aspect ratios of recording resolution, and a module corresponding to one aspect ratio of recording resolution is selected and used to perform halftone processing. With this, even though recording resolution is different, if the aspect ratio is the same, halftone processing is performed using a common threshold matrix.

JP2002-135583A discloses an image processing device having a function of performing image quantization based on an error diffusion method. The image processing device changes an error diffusion coefficient according to output resolution, and for example, decreases an error diffusion range in a case where output resolution is low and increases the error diffusion range in a case where output resolution is high.

SUMMARY OF THE INVENTION

In a case where a desired printing mode is selected from among a plurality of printing modes to perform printing, it is necessary to prepare an image processing module for each printing mode, and when the number of printing modes increases, processing becomes complicated. From a viewpoint of accelerating image processing, it is preferable that an image processing module is realized by hardware processing, instead of software processing, and from a viewpoint of hardware design, it is desirable to avoid a complicated image processing flow whenever possible. On the other hand, even in a case where the image processing module is implemented by software, if the image processing flow becomes complicated, a software module becomes enormous and processing load or processing time increases.

In a case where the printing mode changes to change the resolution or the dot arrangement form, like a system based on a color management system (CMS), image processing can be made common without depending on the printing mode. However, in many cases, since the image processing content is associated with resolution and the dot arrangement form, it is necessary to change the image processing content for each printing mode. As a simple example, resolution conversion of the input image is performed according to output resolution, or a system of halftone processing is changed in order to change the dot arrangement form. If the resolution or the dot arrangement form is changed according to the printing mode, since the dot pattern of the halftone image may collapse and image quality may be remarkably deteriorated, it is desirable to perform halftone processing optimized for each printing mode.

Accordingly, in order to output image data (halftone image) with various definition, there is a demand for individually setting processing parameters according to the definition of output image data or individually providing a specific image processing module, and processing becomes complicated. If processing becomes complicated, a system scale increases, and the time required for processing is extended, thereby degrading productivity. Furthermore, in a case of implementing the image processing module based on a field programmable gate array (FPGA) or the like, it is necessary to use high-specification and expensive circuits with complication of processing, and a hardware configuration becomes complicated, making it difficult to implement the image processing module.

Accordingly, in a device which performs printing in various modes with different definition, it is preferable to simplify image processing and to facilitate implementation of the image processing module. However, in the conventional printing device, the simplification of the image processing content and the image processing device based on the viewpoints is not sufficiently achieved.

For example, in the image processing device of JP2012-134968A, in order to execute a plurality of printing modes (a normal printing mode and a zigzag recording printing mode), it is necessary to provide a plurality of processing modules which perform image processing (normal image processing and zigzag recording image processing) for the respective printing modes. Furthermore, in the image processing device of JP2006-186755A, in order to execute a plurality of printing modes (a plurality of aspect ratio modes of image data), it is necessary to provide a plurality of processing modules for the respective aspect ratio modes. Similarly, in the image processing device of JP2002-135583A, in order to execute a plurality of printing modes (output resolution), it is necessary to provide a plurality of processing modules according to output resolution.

In this way, in the conventional printing device, in a case of performing printing in a plurality of definition modes (printing modes), it is necessary to provide the individual processing module for each mode, and the processing content and the hardware configuration of image processing, such as halftone processing, become enlarged.

The invention has been accomplished in consideration of the above-described situation, and an object of the invention is to provide an image processing device capable of suppressing an increase in scale or complication of a module by making processing common among printing modes in image processing based on a plurality of printing modes with different definition to simplify an entire image processing flow, and related techniques.

An aspect of the invention relates to an image processing device which generates a halftone image from an input image of a plurality of printing modes with different definition. The image processing device comprises an image size adjustment unit which adjusts the size of the input image, and a halftone processing unit which performs halftone processing on the input image size-adjusted by the image size adjustment unit to generate a halftone image. The image size adjustment unit adjusts the input image to the same size in two or more printing modes among the plurality of printing modes, and the input image of the same size is subjected to the halftone processing.

According to this aspect, since the input image of the same size is subjected to the halftone processing in the two or more printing modes with different definition, it becomes easy to make image processing, such as halftone processing, common. Accordingly, the size of the input image subjected to halftone processing is the same without depending on the printing mode, whereby it is possible to simplify an entire image processing flow and to effectively suppress an increase in scale or complication of a module.

The term "definition" used herein is a concept including both of resolution (size) and a dot arrangement form. Accordingly, not only the printing modes with different output resolution, but also the printing modes with the same output resolution but with different dot arrangement forms become printing modes with different definition.

The concept of "image" includes "image data" based on a printed image in a broad sense as well as an "image itself" reproduced on a printing medium. Accordingly, the "input image" is original data of an image input to the image processing device, and the "halftone image" is image data representing the on/off of binarized dots after halftone processing.

Preferably, the halftone processing unit limits the arrangement of dots constituting the halftone image to dot arrangeable places of a selected printing mode among the plurality of printing modes.

According to this aspect, the arrangement of the dots (halftone image dots) constituting the halftone image is limited according to the printing mode, and a halftone image conforming to the printing mode can be accurately generated.

The term "dot arrangeable place" used herein means a place (pixel) where a halftone image dot determined based on definition (resolution and dot arrangement form) of a corresponding printing mode can be arranged. In this aspect, the size of the input image subjected to halftone processing is adjusted to the same size without depending on the printing mode. Accordingly, even if a printing mode with low resolution (for example, 600 dpi) is selected or even if a printing mode with high resolution (for example, 1200 dpi) is selected, the image size (resolution) is adjusted to the same resolution (for example, 1200 dpi). For this reason, even in a case where the low resolution printing mode is selected, halftone processing may be performed with the resolution of the high resolution printing mode, and in this case, dot-off is performed in a part of the pixels of image data after size adjustment so as to conform to the original resolution of the low resolution printing mode. For example, regarding an x direction (or y direction), in a case of the relationship of "the resolution of the low resolution printing mode:the resolution of the high resolution printing mode=1: N", the dot arrangeable places in each printing mode are limited such that "the number of dot arrangeable pixels of the halftone image in the low resolution printing mode:the number of dot arrangeable pixels of the halftone image in the high resolution printing mode=1:N" is satisfied.

Preferably, the halftone processing unit performs the halftone processing based on a dither matrix according to the selected printing mode based on a dither method.

According to this aspect, halftone processing using a dither matrix determined based on a printing mode can be performed, and a halftone image conforming to a printing mode can be accurately generated.

The term "dither matrix" used herein is a threshold matrix which is constituted by a plurality of pixels and in which a threshold element is allocated to each pixel, and the on/off of a halftone image dot in each pixel is determined by comparing a threshold element of the dither matrix and a pixel value of the input image.

Preferably, the two or more printing modes include a relatively high resolution printing mode and a relatively low resolution printing mode, and all dot arrangeable places of the low resolution printing mode are included in the dot arrangeable places of the high resolution printing mode.

According to this aspect, since the dot arrangeable places of the low resolution printing mode overlap the dot arrangeable places of the high resolution printing mode, it becomes easy to make halftone processing common.

The "high resolution printing mode" and the "low resolution printing mode" of this aspect are determined based on a relative relationship. Accordingly, a printing mode with highest resolution among a plurality of printing modes may be used as the "high resolution printing mode", and another printing mode may be used as the "low resolution printing mode". Furthermore, a printing mode other than a "printing mode with highest resolution" may be used as the "high resolution printing mode", and a printing mode with resolution lower than the "high resolution printing mode" may be used as the "low resolution printing mode".

Preferably, threshold elements corresponding to the dot arrangeable places of the low resolution printing mode among threshold elements constituting the dither matrix according to the high resolution printing mode have a value smaller or greater than threshold elements corresponding to other places, and the dots constituting the halftone image are arranged with priority at the dot arrangeable places of the low resolution printing mode.

According to this aspect, even in the high resolution printing mode, since the dots constituting the halftone image are arranged with priority at the dot arrangeable places of the low resolution printing mode, halftone processing can be simply performed. The dither method includes "a mode in which a halftone image dot is likely to be on in a pixel corresponding to a pixel of the dither matrix with a threshold element of a small value" and "a mode in which a halftone image dot is likely to be on in a pixel corresponding to a pixel of the dither matrix with a threshold element of a large value", and gradation may be inverted in comparison with the threshold element of the dither matrix.

Preferably, the dither matrix according to the low resolution printing mode is constituted by threshold elements where the dots constituting the halftone image are arranged at all dot arrangeable places of the low resolution printing mode, with a gradation value smaller than a maximum value or a gradation value greater than a minimum value among threshold elements constituting the dither matrix according to the high resolution printing mode.

According to this aspect, even if the size of the input image subjected to halftone processing is adjusted to the same size without depending on the printing mode, the dot arrangement corresponding to the low resolution printing mode and the dot arrangement corresponding to the high resolution printing mode can be accurately realized in a halftone image. The threshold elements of the dither matrix and the dot arrangeable places of each printing mode are associated with each other like this aspect, whereby a halftone image according to the printing mode can be accurately generated while distinguishing between "the dot arrangeable places of the low resolution printing mode" and "the dot arrangeable places of the high resolution printing mode".

For example, in "the mode in which a halftone image dot is likely to be on in a pixel corresponding to a pixel of the dither matrix with a threshold element of a small value", it is desirable that the dither matrix according to the low resolution printing mode is constituted by threshold elements where the dots constituting the halftone image are arranged at all dot arrangeable places of the low resolution printing mode, with a gradation value smaller than a maximum value among threshold elements constituting the dither matrix according to the high resolution printing mode. On the other hand, in "the mode in which a halftone image dot is likely to be on in a pixel corresponding to a pixel of the dither matrix with a threshold element of a large value", it is desirable that the dither matrix according to the low resolution printing mode is constituted by threshold elements where the dots constituting the halftone image are arranged at all dot arrangeable places of the low resolution printing mode, with a gradation value greater than a minimum value among threshold elements constituting the dither matrix according to the high resolution printing mode.

Preferably, the image processing device further comprises a gradation value adjustment unit which adjusts a gradation value of the input image, a value of a threshold element used to determine that the dots of the halftone image are arranged at all dot arrangeable places, among the threshold elements constituting the dither matrix, is determined for each of the plurality of printing modes, the gradation value adjustment unit adjusts the gradation value of the input image such that the input image does not have a gradation value greater or smaller than a value of a threshold element used to determine that the dots are arranged at all dot arrangeable places of the selected printing mode, among the threshold elements constituting the dither matrix, and the halftone processing unit performs the halftone processing on the input image having the gradation value adjusted by the gradation value adjustment unit.

According to this aspect, the gradation value of the input image is adjusted, whereby a halftone image can be accurately generated while distinguishing between the dot arrangeable places of the low resolution printing mode and the dot arrangeable places of the high resolution printing mode.

For example, in "the mode in which a halftone image dot is likely to be on in a pixel corresponding to a pixel of the dither matrix with a threshold element of a small value", it is preferable that the gradation value adjustment unit adjusts the gradation value of the input image such that the input image does not have a gradation value greater than a value of a threshold element used to determine that the dots are arranged at all dot arrangeable places of the selected printing mode, among the threshold elements constituting the dither matrix. On the other hand, in "the mode in which a halftone image dot is likely to be on in a pixel corresponding to a pixel of the dither matrix with a threshold element of a large value", it is preferable that the gradation value adjustment unit adjusts the gradation value of the input image such that the input image does not have a gradation value smaller than a value of a threshold element used to determine that the dots are arranged at all dot arrangeable places of the selected printing mode, among the threshold elements constituting the dither matrix.

"The value (all-dots arrangement determination threshold element) of the threshold element used to determine that the dots of the halftone image are arranged at all dot arrangeable places" is the maximum value or the minimum value of the threshold element allocated to the pixel of the dither matrix corresponding to the dot arrangeable place determined for each printing mode. It is preferable that a threshold element having a value greater or smaller than the all-dots arrangement determination threshold element is allocated to a pixel of the dither matrix corresponding to a "dot arrangement inhibition place (pixel)" determined for each printing mode.

That is, in "the mode in which a halftone image dot is likely to be on in a pixel corresponding to a pixel of the dither matrix with a threshold element of a small value", it is preferable that "the value (all-dots arrangement determination threshold element) of the threshold element used to determine that the halftone image dots are arranged at all dot arrangeable places" is set to the maximum value of the threshold elements allocated to the pixels of the dither matrix corresponding to the dot arrangeable places determined for each printing mode. On the other hand, in "the mode in which a halftone image dot is likely to be on in a pixel corresponding to a pixel of the dither matrix with a threshold element of a large value", it is preferable that "the value (all-dots arrangement determination threshold element) of the threshold element used to determine that the halftone image dots are arranged at all dot arrangeable places" is set to the minimum value of the threshold elements allocated to the pixels of the dither matrix corresponding to the dot arrangeable places determined for each printing mode. Furthermore, in "the mode in which a halftone image dot is likely to be on in a pixel corresponding to a pixel of the dither matrix with a threshold element of a small value", it is preferable that a threshold element having a value greater than the all-dots arrangement determination threshold element is allocated to a pixel of the dither matrix corresponding to the "dot arrangement inhibition place (pixel)". On the other hand, in "the mode in which a halftone image dot is likely to be on in a pixel corresponding to a pixel of the dither matrix with a threshold element of a large value", it is preferable that a threshold element having a value smaller than the all-dots arrangement determination threshold element is allocated to a pixel of the dither matrix corresponding to the "dot arrangement inhibition place (pixel)".

Preferably, a maximum value among the threshold elements constituting the dither matrix according to the low resolution printing mode is greater than a maximum value or is smaller than a minimum value of the threshold elements constituting the dither matrix according to the high resolution printing mode.

According to this aspect, the threshold element of the dither matrix is adjusted, whereby a halftone image can be accurately generated while distinguishing between the dot arrangeable places of the low resolution printing mode and the dot arrangeable places of the high resolution printing mode.

For example, in "the mode in which a halftone image dot is likely to be on in a pixel corresponding to a pixel of the dither matrix with a threshold element of a small value", it is preferable that the maximum value of the threshold elements constituting the dither matrix according to the low resolution printing mode is greater than the maximum value of the threshold elements constituting the dither matrix according to the high resolution printing mode. On the other hand, in "the mode in which a halftone image dot is likely to be on in a pixel corresponding to a pixel of the dither matrix with a threshold element of a large value", it is preferable that the maximum value of the threshold elements constituting the dither matrix according to the low resolution printing mode is smaller than the minimum value of the threshold elements constituting the dither matrix according to the high resolution printing mode.

It is preferable that "the maximum value of the threshold elements constituting the dither matrix according to the low resolution printing mode" of this aspect is greater than an expressible maximum gradation value of the input image, and it is preferable that the maximum value or the minimum value of the threshold elements is allocated to a pixel of the dither matrix corresponding to the dot arrangement inhibition place of the low resolution printing mode. That is, in "the mode in which a halftone image dot is likely to be on in a pixel corresponding to a pixel of the dither matrix with a threshold element of a small value", it is preferable that the maximum value of the threshold elements is allocated to a pixel of the dither matrix corresponding to the dot arrangement inhibition place of the low resolution printing mode. On the other hand, in "the mode in which a halftone image dot is likely to be on in a pixel corresponding to a pixel of the dither matrix with a threshold element of a large value", it is preferable that the minimum value of the threshold elements is allocated to a pixel of the dither matrix corresponding to the dot arrangement inhibition place of the low resolution printing mode.

Preferably, the halftone processing unit performs the halftone processing using a dot arrangement mask which designates the dot arrangeable places of the selected printing mode.

According to this aspect, with mask processing using the dot arrangement mask, the dot arrangement of the halftone image can simply conform to the definition of the printing mode.

The "dot arrangement mask" used herein is mask data which determines the on/off of a halftone image dot, and designates a dot arrangeable place or a dot arrangement inhibition place of each printing mode. Mask processing using the dot arrangement mask can be realized by an arbitrary method, and for example, can be designed as a part of a calculation algorithm of halftone processing.

Preferably, the two or more printing modes include a relatively high resolution printing mode and a relatively low resolution printing mode, and all dot arrangeable places of the low resolution printing mode are included in the dot arrangeable places of the high resolution printing mode.

Preferably, the halftone processing unit performs the halftone processing based on processing parameters according to the selected printing mode.

According to this aspect, with the processing parameters according to the printing mode, halftone processing conforming to the definition of the printing mode can be accurately performed.

Preferably, the halftone processing unit performs the halftone processing based on an error diffusion method, and the processing parameters include an error diffusion coefficient matrix.

According to this aspect, halftone processing based on the error diffusion method can be performed according to the definition of the printing mode.

The "error diffusion method" used herein is a method which diffuses an error component generated by determining the dot-on/off for each pixel with halftone processing (binarization processing) and reflects the error component in the pixel values of other pixels, and an arbitrary error diffusion method may be used.

Another aspect of the invention relates to a printing apparatus comprising the above-described image processing device, and a recording unit which performs recording on a printing medium based on the halftone image.

Still another aspect of the invention relates to an image processing method which generates a halftone image from an input image of a plurality of printing modes with different definition. The image processing method comprises an image size adjustment step of adjusting the size of the input image, and a halftone processing step of performing halftone processing on the input image size-adjusted in the image size adjustment step to generate a halftone image. In the image size adjustment step, the input image is adjusted to the same size in two or more printing modes among the plurality of printing modes, and the input image of the same size is subjected to the halftone processing.

Still another aspect of the invention relates to a program for generating a halftone image from an input image of a plurality of printing modes with different definition. The program causes a computer to execute a procedure for adjusting the size of the input image, and a procedure for performing halftone processing on the size-adjusted input image to generate a halftone image. The input image is adjusted to the same size in two or more printing modes among the plurality of printing modes, and the input image of the same size is subjected to the halftone processing.

According to the invention, image processing (halftone processing) can be made common in a plurality of printing modes with different definition (resolution and dot arrangement form), and an image processing flow and the image processing module can be simplified. With this, it is possible to effectively suppress an increase in scale and complication of an image processing module by facilitating hardware implementation of an image processing unit, and to reduce manufacturing costs of an image processing device.

BRIEF DESCRIPTION OF THE DRAWINGS

FIG. 1 is a block diagram showing an example of a printing apparatus.

FIG. 2A is a diagram illustrating definition (resolution and dot arrangement form) of each printing mode, and shows "1200 dpi×1200 dpi (x direction×y direction)".

FIG. 3 shows a flow for creating halftone image data from input image data.

FIG. 14 shows a program code example according to error diffusion processing using a dot arrangement mask separately from an error diffusion coefficient matrix.

FIG. 15A is a diagram illustrating an error diffusion coefficient matrix reflecting a dot arrangement mask.

FIG. 16 shows a program code example according to error diffusion processing using an error diffusion coefficient matrix reflecting a dot arrangement mask.

DESCRIPTION OF THE PREFERRED EMBODIMENTS

Figure 2B:
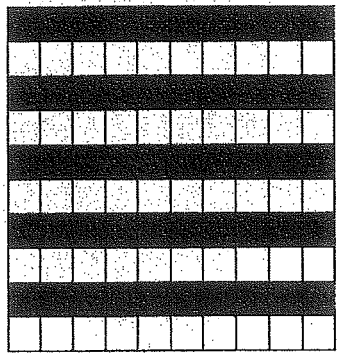
FIG. 2B is a diagram illustrating definition (resolution and dot arrangement form) of each printing mode, and shows "1200 dpi×600 dpi" (linear arrangement).

Embodiments of the invention will be described referring to the accompanying drawings. Although an example where the invention is applied to printing of an ink jet system (single pass system) will be described below, the invention is not limited thereto. An image processing technique according to the invention can be widely applied to all printing techniques which are switchable to a desired mode from among a plurality of printing modes, and can be applied to a printing system, such as an offset system, a gravure system, a flexographic system, and an electrophotographic printing system, in addition to an ink jet system (for example, a single pass system).

FIG. 1 is a block diagram showing an example of a printing apparatus. A printing apparatus 10 includes a printing condition setting unit 12, an image processing unit (image processing device) 14, and a printing head unit 16, and prints and records image data on a printing medium in a desired printing mode from among a plurality of printing modes with different definition.

The printing condition setting unit 12 functions as a "printing image acquisition unit" which acquires image data to be printed, a "printing mode acquisition mode" which acquires a printing mode of image data, and a "printing information supply unit" which stores and acquires other kinds of necessary information and supplies information to the image processing unit 14 and the printing head unit 16. Image data to be printed, information relating to the printing mode, and other kinds of information are transmitted from the printing condition setting unit 12 to the image processing unit 14 and the printing head unit 16 as necessary.

An acquisition method of a printing method in the printing mode acquisition unit is not particularly limited, and a printing mode may be determined based on a user's selection, or the printing condition setting unit 12 may appropriately determine a printing mode based on printing conditions (environmental conditions). Other kinds of information supplied from the printing information supply unit are not particularly limited, and for example, drive waveform data for determining an ink ejection dot diameter (diameter per dot; for example, dot diameter of large, medium, and small) is selected and determined based on a printing mode or the like and is transmitted from the printing condition setting unit 12 to the printing head unit 16.

The image processing unit 14 generates data of a halftone image from an input image according to the definition of the printing mode, and supplies halftone image data to the printing head unit 16. Though detailed configuration and action will be described below, the image processing unit 14 includes an image size adjustment unit which adjusts the size of the input image, and a halftone processing unit which performs halftone processing on the input image size-adjusted by the image size adjustment unit to generate a halftone image. In particular, in this example, the image size adjustment unit adjusts the input image to the same size in two or more printing modes among a plurality of printing modes, and the input image of the same size is subjected to halftone processing. With this, it becomes easy to make image processing common among a plurality of printing modes with different definition, and it is possible to simplify an image processing flow and an image processing module.

The printing head unit 16 is a recording unit (ejection drive unit) which performs recording on the printing medium based on halftone image data supplied from the image processing unit 14, and ejects ink droplets toward the printing medium based on drive waveform data. A specific method of ink ejection is not particularly limited, and for example, ink is ejected from the printing head unit 16 (ink jet head) toward the printing medium by a piezoelectric system using a piezoelectric element, a thermal system using a foam pressure, or the like.

<Printing Mode>

The printing apparatus 10 of this example performs image processing and printing processing according to an arbitrary printing mode determined from among a plurality of printing modes with different definition.

Figure 2C:
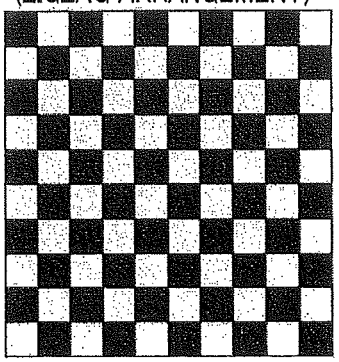
FIG. 2C is a diagram illustrating definition (resolution and dot arrangement form) of each printing mode, and shows "1200 dpi×600 dpi" (zigzag arrangement).
Figure 2D:
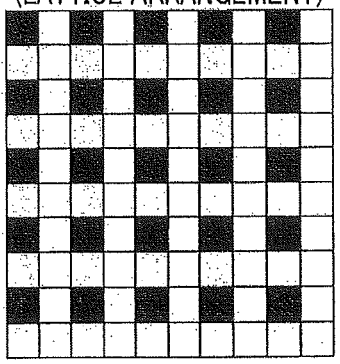
FIG. 2D is a diagram illustrating definition (resolution and dot arrangement form) of each printing mode, and shows "600 dpi×600 dpi" (lattice arrangement).
Figure 2E:
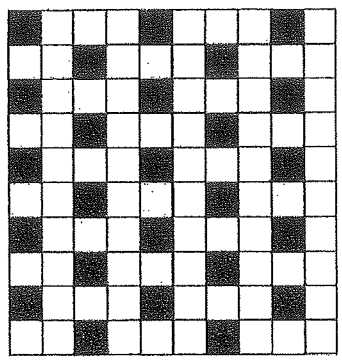
FIG. 2E is a diagram illustrating definition (resolution and dot arrangement form) of each printing mode, and shows "600 dpi×600 dpi" (hexagonal arrangement).
Figure 2F:
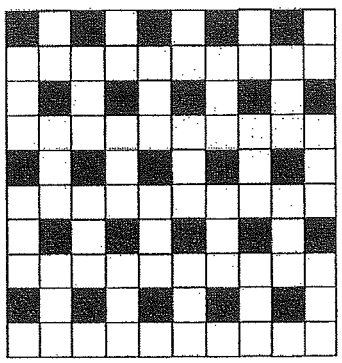
FIG. 2F is a diagram illustrating definition (resolution and dot arrangement form) of each printing mode, and shows "600 dpi×600 dpi" (triangular arrangement).

FIGS. 2A to 2F are diagrams illustrating definition (resolution and dot arrangement form) of each printing mode, FIG. 2A shows "1200 dpi×1200 dpi (x direction×y direction)", FIG. 2B shows "1200 dpi×600 dpi" (linear arrangement), FIG. 2C shows "1200 dpi×600 dpi" (zigzag arrangement), FIG. 2D shows "600 dpi×600 dpi" (lattice arrangement), FIG. 2E shows "600 dpi×600 dpi" (hexagonal arrangement), and FIG. 2F shows "600 dpi×600 dpi" (triangular arrangement).

Each dot of the dot arrangement pattern examples shown in FIGS. 2A to 2F has the same diameter (same size), and in the dot arrangement pattern of "1200 dpi×1200 dpi", solid printing is performed (see FIG. 2A). However, "solid printing" in which ink is applied to the entire surface of a target printing area can be expressed with each resolution and each dot arrangement pattern by adjusting the dot diameter. The dot diameter depends on the drive waveform, and typically, the drive waveform is switched according to the printing mode. In this case, the drive waveform to be used is different between a "relatively low resolution mode" and a "relatively low resolution mode", and an actual dot size may not be common between both modes. In a case of switching the dot type without switching the drive waveform, the dot type which can be used for each printing mode is limited, and the degree of freedom of halftone is lowered.

The dot arrangement pattern recorded on the printing medium may be of a wide variety as shown in FIGS. 2A to 2F, and may have the same resolution but may be different in the dot arrangement form (for example, in regard to "1200 dpi×600 dpi", see FIGS. 2B and 2C; in regard to "600 dpi×600 dpi", see FIGS. 2D to 2F). FIGS. 2A to 2F illustrate only the dot arrangement pattern, and a printing mode based on different resolution and a different dot arrangement pattern may be appropriately used.

FIG. 3 shows a flow for creating halftone image data from input image data. Respective image processing shown in FIG. 3 is primarily performed by the image processing unit 14 (see FIG. 1).

Input image data D0 (for example, data of "4-channel images (4 ch: in this example, cyan image, magenta image, yellow image, and black image), 8-bit gradation (8 bit: 256 gradation: 0 to 255 gradation value), and 300 dpi (x direction and y direction)") input from the printing condition setting unit 12 to the image processing unit 14 is color-corrected by color management system processing (CMS) S1, and data of CMS-adjusted image D1 (4 ch, 8 bit, 300 dpi) is created. The CMS-adjusted image D1 is separated into image data of process colors by plate separation processing S2, and for example, image data D2 (1 ch, 8 bit, 300 dpi) of each of "the cyan image, the magenta image, the yellow image, and the black image" is created.

Each piece of image data D2 of the process colors is subjected to resolution conversion processing S3 and adjusted in resolution. In the resolution conversion processing S3, resolution adjustment of image data is performed according to the definition of the printing mode. For example, in a case where the resolution of image data D2 is 300 dpi and the resolution of the printing mode corresponds to 1200 dpi, the resolution of image data is converted from 300 dpi to 1200 dpi by the resolution conversion processing S3.

Image data D3 (1 ch, 8 bit, 1200 dpi) after resolution conversion is converted in the number of bits by unevenness correction processing S4, and for example, multi-bit conversion from 8 bits to 12 bits is performed. A specific processing content of unevenness correction is not particularly limited, and in this example, unevenness correction processing optimized for an ink jet system (single pass system) is performed. Image data D4 (1 ch, 12 bit, 1200 dpi) after unevenness correction is multivalued by halftone processing S5, and halftone image data D5 (1 ch, 2 bit, 1200 dpi) is created.

Halftone image data D5 of the respective process colors is supplied to the corresponding heads (cyan head, magenta head, yellow head, and black head) of the printing head unit 16 (S6), ink of the corresponding colors is ejected from the respective heads toward the printing medium, and printing of image data is performed.

A series of processing (S1 to S6) described above may be implemented by one of software and hardware. However, it is desirable that image processing is performed at as high speed as possible, and in particular, it is desirable that, from a viewpoint of accelerating processing, processing (in FIG. 3, the resolution conversion processing S3 to the halftone processing S5) after conversion to image data of the respective colors is implemented by hardware.

In the printing apparatus 10 which can perform printing in a plurality of printing modes with different definition, there is a demand for adapting a series of processing (in particular, image processing after conversion to image data of the respective colors) described above to the selected printing mode.

Figure 4:
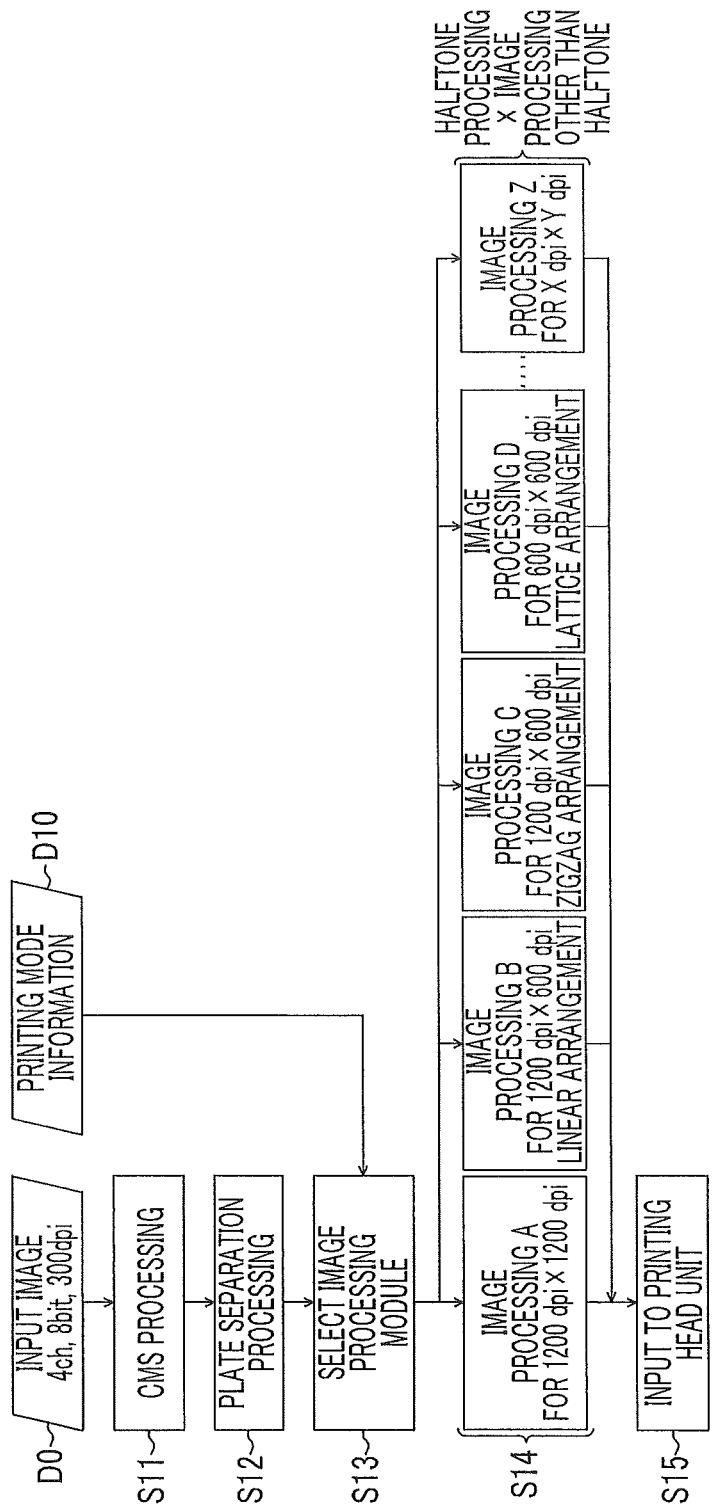
FIG. 4 shows a processing flow until input image data is subjected to image processing and input to a printing head unit.

FIG. 4 shows a processing flow until input image data is subjected to image processing and input to the printing head unit 16. Respective processing shown in FIG. 4 is performed by the image processing unit 14 (see FIG. 1).

In this example, similarly to the case shown in FIG. 3, image data (1 ch, 8 bit) of each process color is created from input image data D0 (4 ch, 8 bit, 300 dpi) by the "CMS processing S11" and the "plate separation processing S12". However, thereafter, different image processing is performed for each selected printing mode (definition mode). That is, a corresponding image processing module is prepared in advance for each printing mode, and the corresponding image processing module is selected based on information (printing mode information D10) relating to a desired printing mode selected from among a plurality of kinds of image processing (S13). Then, image processing of image data of each process color is performed by the selected image processing module (image processing content) (S14), and then, halftone image data is supplied to the printing head unit 16.

In the example shown in FIG. 4, in a case where the selected printing mode is based on definition (see FIG. 2A) of "1200 dpi×1200 dpi (x direction×y direction)", image processing A is performed, in a case where the selected printing mode is based on definition (see FIG. 2B) of "1200 dpi×600 dpi" (linear arrangement), image processing B is performed, in a case where the selected printing mode is based on definition (see FIG. 2C) of "1200 dpi×600 dpi" (zigzag arrangement), image processing C is performed, in a case where the selected printing mode is based on "600 dpi×600 dpi" (lattice arrangement), image processing D is performed, and in a case where the selected printing mode is based on definition of "X dpi×Y dpi", image processing Z is performed. Each of the image processing A to the image processing Z includes "image processing other than halftone processing" and "halftone processing" optimized for the corresponding printing mode, and generates high-quality halftone image data according to the printing mode.

In this way, in the example shown in FIG. 4, the corresponding image processing module (hardware module and/or software module) is prepared in advance for each printing mode, and halftone image data is generated using a different image processing module for each printing mode. Accordingly, it is necessary to prepare the image processing modules corresponding to the number of printing modes in advance, and the number of image processing modules to be prepared increases with an increase in the number of printing modes that the printing apparatus 10 can cope with. For this reason, the printing apparatus 10 (image processing device) of the system shown in FIG. 4 increases in manufacturing cost and lacks flexibility of processing for the printing modes.

Accordingly, it is desirable that image processing is made common in a plurality of printing modes, "image processing (unevenness correction processing or the like) other than halftone processing" is executed without switching the printing mode, and "halftone processing" is realized with the same device (module) and procedure whenever possible in a plurality of printing modes.

Hereinafter, an example where an image processing device (image processing method) which can make image processing including halftone processing common in a plurality of printing modes will be described.

Figure 5:
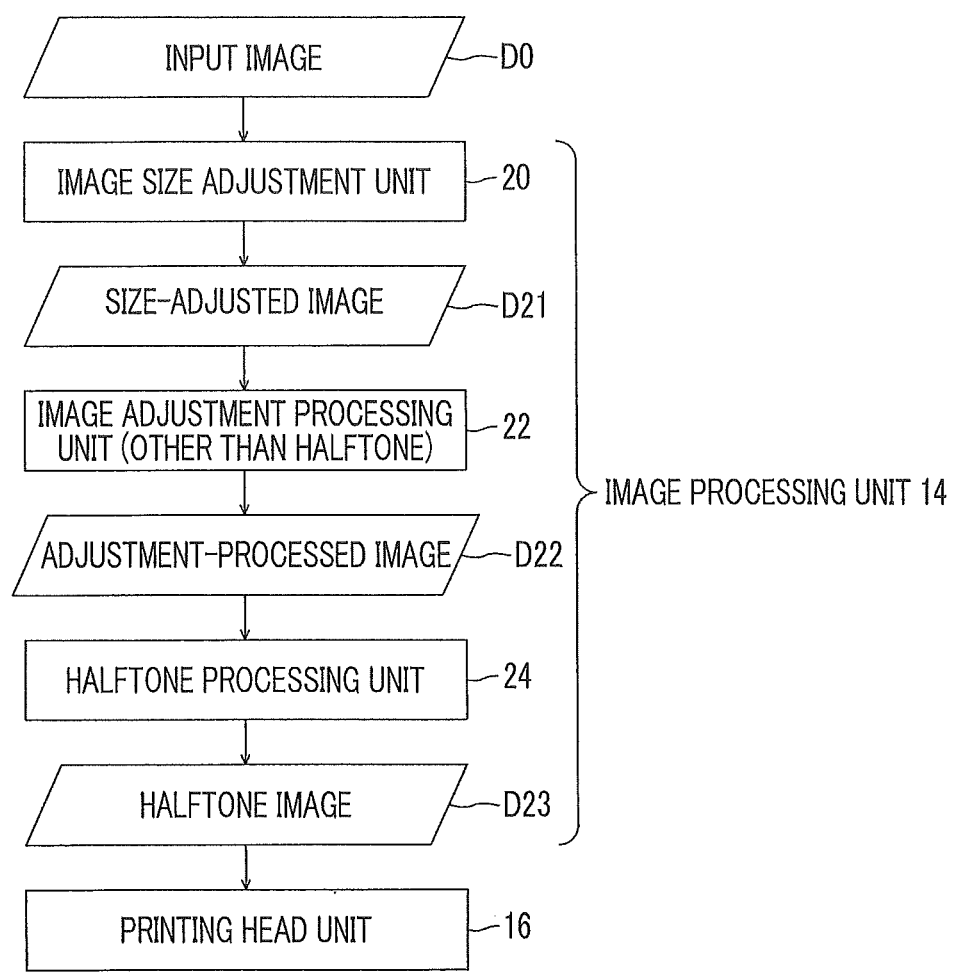
FIG. 5 is a block diagram showing an example of an image processing device.

FIG. 5 is a block diagram showing an example of an image processing device. The image processing device (image processing unit 14) has an image size adjustment unit 20, an image adjustment processing unit 22, and a halftone processing unit 24, and generates data of a halftone image D23 according to a desired printing mode. That is, the size (resolution) of input image data D0 is adjusted in the image size adjustment unit 20 (image size adjustment step), and the size-adjusted input image (size-adjusted image D21) is subjected to image processing other than halftone processing in the image adjustment processing unit 22. The input image (adjustment processing image D22) size-adjusted and subjected to image processing other than halftone processing is subjected to halftone processing in the halftone processing unit 24, and the halftone image D23 is generated (halftone processing step). Data (halftone image data) relating to the halftone image D23 is supplied from the halftone processing unit 24 to the printing head unit 16.

In this way, in this example, image processing ("image processing other than halftone processing" and "halftone processing") is performed after the size (resolution) of the input image is adjusted. Accordingly, since the input image is adjusted to the same size in a plurality of printing modes, and the input image of the same size is subjected to image processing, such as halftone processing, it is possible to simply make image processing, such as halftone processing, common.

In general, even if image processing other than halftone processing is performed in common in a plurality of printing modes with different definition, in many cases, the influence on printing image quality is comparatively small; however, it is difficult to make halftone processing common in the printing modes with different definition (in particular, the dot arrangement form). That is, if "halftone processing" is made common in the printing modes with different resolution and dot arrangement patterns, an image may collapse, and printing image quality may be remarkably deteriorated. For this reason, in the related art, the same image processing (in particular, "halftone processing") is not applied in the printing modes with different resolution and dot arrangement patterns while maintaining image quality of a printing image at high quality.

However, the inventors have conducted intensive studies and have newly found that image processing (in particular, "halftone processing") is performed after the size (resolution) of the input image is adjusted to the same size without depending on the printing mode, thereby effectively preventing deterioration of image quality and making image processing common in a plurality of printing modes with different definition.

A specific method of "adjusting the size of the input image to the same size in the image size adjustment step" is not particularly limited. For example, even if original input image data is 300 dpi, and the resolution (definition) of the selected printing mode is 600 dpi, image data is changed to 1200 dpi in the image size adjustment step regardless of "original input image data" and the "printing mode".

The halftone processing unit 24 limits the arrangement of the dots constituting the halftone image D23 to the dot arrangeable places of the selected printing mode among a plurality of printing modes. That is, the halftone processing unit 24 performs halftone processing reflecting the definition (resolution and dot arrangement form) of the selected printing mode to arrange the halftone image dots only at the dot arrangeable pixels of the selected printing mode. With this, it is possible to reliably generate halftone image data according to the definition of the selected printing mode.

In this way, the image size adjustment processing and the halftone processing are contrived, whereby it is possible to prevent deterioration of a printing image and to make image processing common in a plurality of printing modes. With this, for example, "the switching processing of the image processing content of each printing mode" required in the image processing device of JP2012-134968A is not required, and it is possible to perform appropriate halftone processing according to the printing mode. Furthermore, "providing of a different module for each aspect ratio of recording resolution" required in the image processing device of JP2006-186755A is not required, and it is possible to perform appropriate halftone processing with a single processing module in printing modes with different aspect ratios of recording resolution or printing modes with different dot arrangement forms.

Hereinafter, in regards to "halftone processing (first embodiment) based on a dither method" and "halftone processing (second embodiment) other than a method (error diffusion method or the like) other than a dither method", a specific example of "making "image processing (halftone processing) common in printing modes with different definition" will be described.

First Embodiment

The halftone processing unit 24 of this embodiment performs halftone processing based on a dither matrix according to a selected printing mode based on a dither method. In this embodiment, although "a mode in which a halftone image dot is likely to be on in a pixel corresponding to a pixel of the dither matrix with a threshold element of a small value" is used, even in "a mode in which a halftone image dot is likely to be on in a pixel corresponding to a pixel of the dither matrix with a threshold element of a large value", it is possible to perform the same halftone processing.

Figure 6:
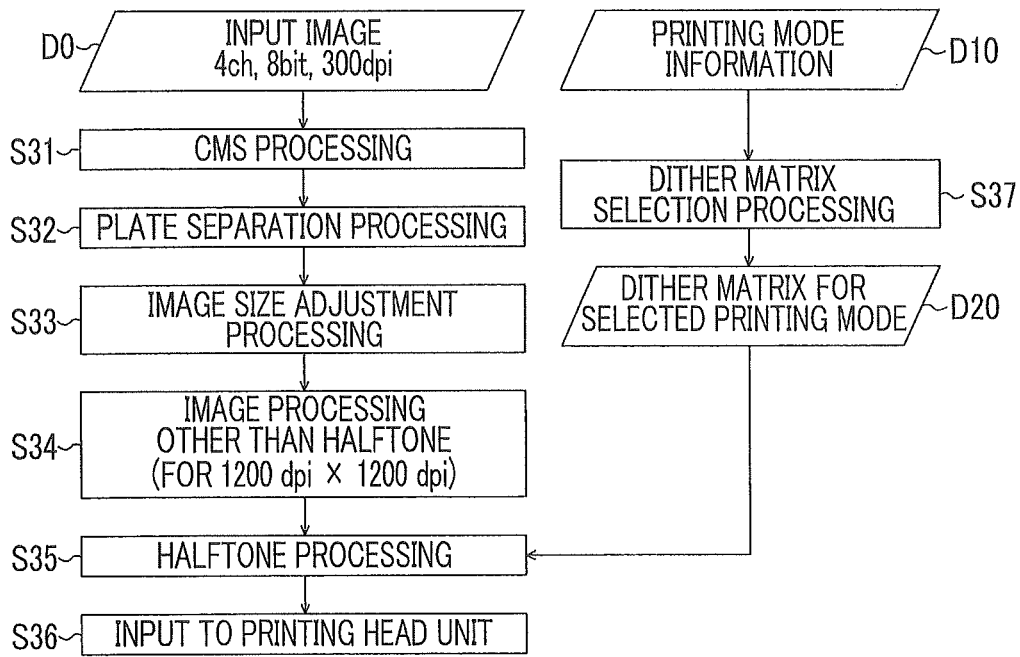
FIG. 6 shows an image processing flow according to a first embodiment.

FIG. 6 shows an image processing flow according to a first embodiment. Respective image processing shown in FIG. 6 is primarily performed by the image processing unit 14 (see FIG. 1).

In this embodiment, similarly to the processing flow shown in FIG. 4, CMS processing (S31 of FIG. 6) and plate separation processing (S32) are performed, and image data of each process color is acquired from input image data D0.

However, in this embodiment, the size (resolution) of image data of each process color is adjusted (S33), and image data of the same size (same resolution: for example, resolution of "1200 dpi×1200 dpi") is transmitted to a post stage regardless of the printing mode. The size conversion processing is performed by converting image data to the highest resolution (for example, "1200 dpi×1200 dpi" (see FIG. 2A)) among the sizes of the printing modes, in which processing is made common, or higher resolution. Image data of each process color whose size is made common is subjected to image processing other than halftone processing in common (S34), and then, halftone processing (S35) is performed. Then, halftone image data is input to the corresponding heads (printing head unit 16) (S36).

The halftone processing unit 24 of this example selects a dither matrix according to a printing mode based on printing mode information D10 from a storage unit (not shown) which stores dither matrixes of respective printing modes (dither matrix selection processing S37), and applies the selected dither matrix (dither matrix D20 for selected printing mode) to image data to perform the halftone processing (S35).

The dither method is halftone processing using a dither matrix in which a numerical value (threshold element) is allocated to each pixel of W pixels×H pixels (x direction×y direction: see FIGS. 7A and 9A described below), and is a method which determines the dot-on/off of each pixel by comparing the threshold element of the dither matrix with the pixel value (gradation value) of image data. For example, the dither matrix is compared with the pixel value (gradation value) of each pixel of image data, a dot is formed with maximum luminance in a pixel in which the pixel value of image data is equal to or greater than the threshold element of the corresponding pixel, and a dot is not formed with minimum luminance in a pixel in which the pixel value of image data is smaller than the corresponding threshold element. With this, multi-gradation image data greater than one bit can be converted to halftone image data of one-bit gradation (dot-on/off). The gradation bit of halftone image data is not limited to one bit. For example, in a case where "no dot", "small-diameter dot", "medium-diameter dot", and "large-diameter dot" are assumed with respect to the output dot of the halftone image, the dot type is represented by "four values", and the gradation bit of halftone image data becomes two bits. In this way, since the gradation bit of halftone image data fluctuates according to the system, the gradation bit is not determined for general use, and halftone processing is multi-value processing, such as binarization processing.

In this embodiment, restraints according to the definition of the printing mode are placed on the dot arrangement by halftone processing, and a halftone pattern corresponding to each printing mode is included in a halftone pattern which can be expressed regarding the maximum resolution (assumed maximum resolution) of the printing mode to be assumed. That is, the two or more printing modes which are used in the printing apparatus 10 of this embodiment include a relatively high resolution printing mode and a relatively low resolution printing mode, and all dot arrangeable places of the low resolution printing mode are included in the dot arrangeable places of the high resolution printing mode.

For example, in a case where the printing apparatus 10 uses a plurality of printing modes based on the definition of FIGS. 2A to 2F, all dot arrangeable places (see FIGS. 2B to 2F) of a printing mode with a different low resolution are included in the dot arrangeable places (see FIG. 2A) of the printing mode with the highest resolution of "1200 dpi×1200 dpi". Accordingly, it is possible to make image processing of one or a plurality of modes among the printing modes of FIG. 2B to FIG. 2F common based on the printing mode with "1200 dpi×1200 dpi" (assumed maximum resolution) of FIG. 2A according to the processing flow of FIG. 6.

Although image processing is performed according to the processing flow of FIG. 6 while making all printing modes of FIGS. 2A to 2F common, image processing may be made common according to the processing flow of FIG. 6 in a part of the printing modes. For example, the dot arrangeable places of the printing mode based on "600 dpi×600 dpi (lattice arrangement)" of FIG. 2D are included in the dot arrangeable places of the printing mode based on "1200 dpi×600 dpi (linear arrangement)" of FIG. 2B. Accordingly, image processing can be made common according to the processing flow of FIG. 6 only in the printing mode of FIG. 2B and printing mode of FIG. 2D. Similarly, image processing can be made common according to the processing flow of FIG. 6 in "the printing mode of FIG. 2B, the printing mode of FIG. 2D, and the printing mode of FIG. 2F", "the printing mode of FIG. 2C and the printing mode of FIG. 2D", and the like.

In this way, in a case of making image processing common only in a part of the printing modes, in other printing modes which are not made common, a dedicated image processing module (see S13 and S14 of FIG. 4) may be prepared and used to perform image processing. In this case, a dedicated image processing module may be provided in a printing mode with comparatively high definition or a printing mode with a high use frequency, and image processing may be made common in a printing mode with comparatively low definition or a printing mode with a low use frequency. With this, it is possible to achieve high quality of a printing image and simplification of a processing module at high level.

Hereinafter, for convenience, a case where image processing is made common in all printing modes corresponding to the dot arrangement patterns of FIGS. 2A to 2F will be described.

In a case of making image processing common in a plurality of printing modes, a corresponding dither matrix is created in advance for each of the printing modes. The threshold elements constituting the dither matrix are adjusted such that the dots are buried only at the dot arrangeable places of the corresponding printing mode. Accordingly, the dither matrix to be used is switched according to the printing mode, whereby restraints according to the definition of the printing mode can be applied to the dot arrangement of the halftone image. With this, image processing other than halftone processing can be made common in a plurality of printing modes, and dot arrangement restraints according to printing mode can be secured by the dither matrix, thereby obtaining an appropriate halftone image.

FIGS. 7A to 10E are diagrams illustrating a dither matrix according to the first embodiment, FIGS. 7A and 7B and FIGS. 8A to 8H are diagrams illustrating a printing mode with relatively high resolution (for example, "1200 dpi×1200 dpi" (assumed maximum resolution)), and FIGS. 9A and 9B and FIGS. 10A to 10E are diagrams illustrating a printing mode with relatively low resolution (for example, "1200 dpi×600 dpi"). FIGS. 7A and 7B and FIGS. 9A and 9B are conceptual diagrams (see FIGS. 7A and 9A) of a dither matrix and show a histogram of "a gradation value-the number of incremented pixels" (see FIGS. 7B and 9B). FIGS. 8A to 8H and FIGS. 10A to 10E are respectively conceptual diagrams of a dot pattern representing the relationship between each pixel and a threshold element of a dither matrix shown in FIGS. 7A and 7B and FIGS. 9A and 9B.

Although FIGS. 8A to 8H and FIGS. 10A to 10E show a pixel pattern of a dither matrix which is applied to image data expressed in 12-bit gradation (the number of gradations: 4096; gradation value: 0 to 4095), a dither matrix corresponding different bit gradation (for example, 8-bit gradation (the number of gradations: 256; gradation value: 0 to 255)) may be used.

Figure 7A:
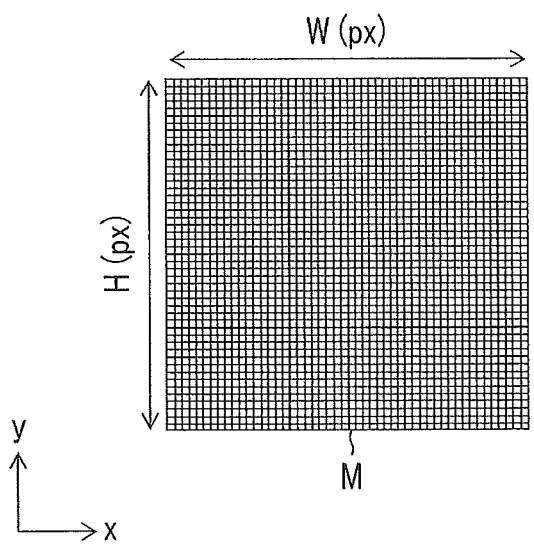
FIG. 7A is a conceptual diagram of a dither matrix.
Figure 9A:
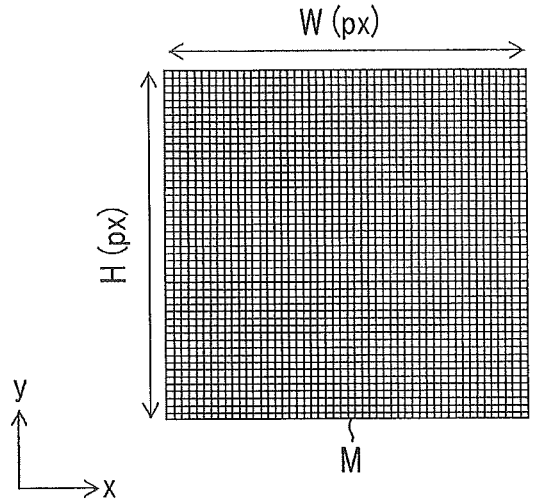
FIG. 9A is a conceptual diagram of a dither matrix.

As shown in FIGS. 7A and 9A, the dither matrix has a matrix structure in which a threshold element is allocated to each pixel of "W pixels×H pixels (x direction and y direction; "W" and "H" are arbitrary integers)". The value of the threshold element allocated to each pixel is determined according to the gradation (bit) of image data to be processed. For example, in a dither matrix for use in halftone processing of image data expressed in 12-bit gradation, a numerical value (threshold element) in a range of "0 to 4095" is allocated to each pixel according to an arbitrary arrangement method, such as a Bayer type, a spiral type, or a halftone dot type.

Figure 7B:
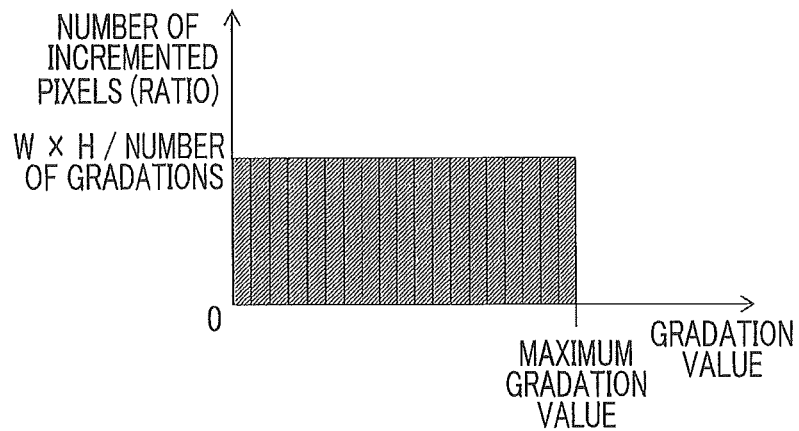
FIG. 7B shows a histogram of "a gradation value-the number of incremented pixels".
Figure 8A:
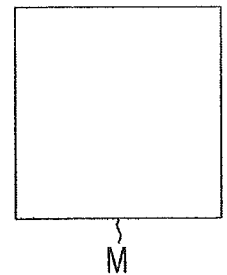
FIG. 8A is a conceptual diagram of a dot pattern representing the relationship between each pixel and a threshold element of a dither matrix shown in FIGS. 7A and 7B.
Figure 8B:
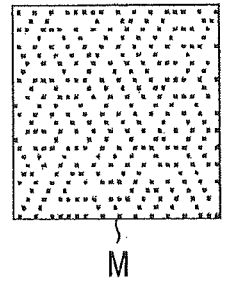
FIG. 8B is a conceptual diagram of a dot pattern representing the relationship between each pixel and a threshold element of a dither matrix shown in FIGS. 7A and 7B.
Figure 8C:
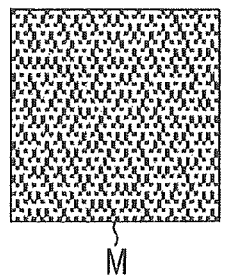
FIG. 8C is a conceptual diagram of a dot pattern representing the relationship between each pixel and a threshold element of a dither matrix shown in FIGS. 7A and 7B.
Figure 8D:
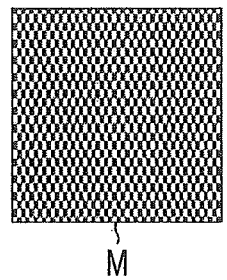
FIG. 8D is a conceptual diagram of a dot pattern representing the relationship between each pixel and a threshold element of a dither matrix shown in FIGS. 7A and 7B.
Figure 8E:
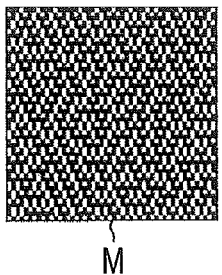
FIG. 8E is a conceptual diagram of a dot pattern representing the relationship between each pixel and a threshold element of a dither matrix shown in FIGS. 7A and 7B.
Figure 8F:
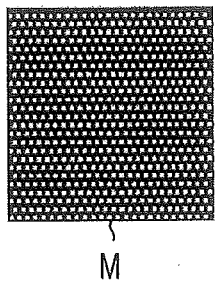
FIG. 8F is a conceptual diagram of a dot pattern representing the relationship between each pixel and a threshold element of a dither matrix shown in FIGS. 7A and 7B.
Figure 8G:
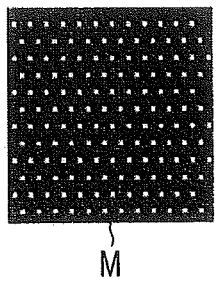
FIG. 8G is a conceptual diagram of a dot pattern representing the relationship between each pixel and a threshold element of a dither matrix shown in FIGS. 7A and 7B.
Figure 8H:
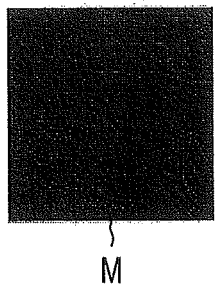
FIG. 8H is a conceptual diagram of a dot pattern representing the relationship between each pixel and a threshold element of a dither matrix shown in FIGS. 7A and 7B.

According to halftone processing using the dither matrix shown in FIGS. 7A and 7B which is applied to a printing mode with relatively high resolution (for example, "1200 dpi×1200 dpi"), as shown in FIG. 7B, the "number of incremented pixels (ratio)" to the "gradation value" (substantially) becomes a constant value. That is, if the gradation value is increased by "1", the number of halftone image dots is increased by "W×H/the number of gradations". In a case where "W×H/the number of gradations" is not an integer value, the "number of incremented pixels (ratio)" to each gradation value is determined by arbitrary rounding processing.

In each of FIGS. 8A to 8H, a pixel to which a threshold element equal to or less than a predetermined value ("binarized threshold") is allocated is represented by a black dot. The dither matrix of this example does not include a threshold element equal to or less than "0" (see FIG. 8A), includes threshold elements equal to or less than "491" by "12% (dot ratio)" of the whole (see FIG. 8B), includes threshold elements equal to or less than "1024" by "25%" of the whole (see FIG. 8C), includes threshold elements equal to or less than "2048" by "50%" of the whole (see FIG. 8D), includes threshold elements equal to or less than "2580" by "63%" of the whole (see FIG. 8E), includes threshold elements equal to or less than "3072" by "75%" of the whole (see FIG. 8F), and includes threshold elements equal to or less than "3850" by "94%" (see FIG. 8G), and the whole is constituted by threshold elements equal to or less than "4095" (see FIG. 8H).

Figure 9B:
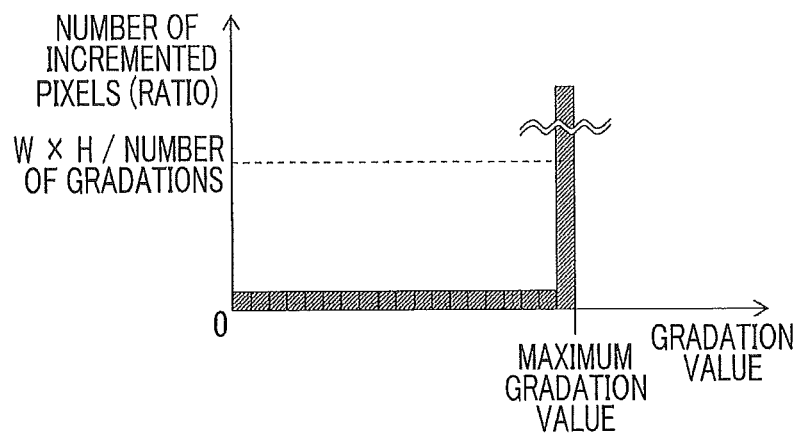
FIG. 9B shows a histogram of "a gradation value-the number of incremented pixels".

In halftone processing using the dither matrix shown in FIG. 9A which is applied to a printing mode with relatively low resolution (for example, "1200 dpi×600 dpi"), as shown in FIG. 9B, the "number of incremented pixels (ratio)" to the "gradation value" does not necessarily become a constant value. In the example shown in FIGS. 9A and 9B, the number of incremented pixels is (substantially) constant at a gradation value other than a maximum gradation value but is smaller than "W×H/the number of gradations", and the number of incremented pixels becomes greater than "W×H/the number of gradations" between "the maximum gradation value−1" and the "maximum gradation value".

In a case of "the mode in which a halftone image dot is likely to be on in a pixel corresponding to a pixel of the dither matrix with a threshold element of a large value", the number of incremented pixels is (substantially) constant at a gradation value other than a minimum gradation value but is greater than "W×H/the number of gradations", and the number of incremented pixels becomes greater than "W×H/the number of gradations" between "the minimum gradation value+1" and the "minimum gradation value".

FIGS. 10A to 10E are conceptual diagrams of a dot pattern representing the relationship between each pixel and a threshold element of a dither matrix shown in FIGS. 9A and 9B. FIGS. 10A to 10E show a pixel pattern of a dither matrix which is applied to image data expressed in 12-bit gradation (the number of gradations: 4096; gradation value: 0 to 4095), and a pixel to which a threshold element equal to or less than a predetermined ("binarized threshold") is allocated is represented by a black dot in each of FIGS. 10A to 10E. The dither matrix of this example does not include a threshold element equal to or less than "0" (see FIG. 10A), includes threshold elements equal to or less than "1024" by "12%" of the whole (see FIG. 10B), includes threshold elements equal to or less than "2048" by "25%" of the whole (see FIG. 10C), and includes threshold elements equal to or less than "4094" by "50%" of the whole (see FIG. 10D), and "4095" or a value greater than "4095" is allocated to other pixels of 50% as a threshold element.

As described above, although "the dot ratio of FIGS. 8A to 8D in the high resolution printing mode" and "the dot ratio of FIGS. 10A to 10D in the low resolution printing mode" are the same, the binarized threshold is different.

In this way, the dither matrix according to the low resolution printing mode is constituted by threshold elements where the dots constituting the halftone image are arranged at all dot arrangeable places of the low resolution printing mode, with a gradation value smaller than a maximum value among threshold elements constituting the dither matrix according to the high resolution printing mode. That is, a gradation value (see FIG. 10D) which generates the highest number of dots of the low resolution printing mode with a dither matrix corresponding to a printing mode with lower density dots (low resolution) is set to be lower than a gradation value (see FIG. 8H) which generates the highest number of bits of a high resolution printing mode with a dither matrix corresponding to a printing mode with higher density dots (high resolution). With this, the dither matrix can be switched, whereby it is possible to simply realize the dot arrangement dots according to the printing mode.

In a case of "the mode in which a halftone image dot is likely to be on in a pixel corresponding to a pixel of the dither matrix with a threshold element of a large value", a gradation value which generates the highest number of dots of a low resolution printing mode with a dither matrix corresponding to a printing mode with lower density dots (low resolution) is set to be higher than a gradation value which generates the highest number of dots of a high resolution printing mode with a dither matrix corresponding to a printing mode with higher density dots (high resolution).

Figure 10A:
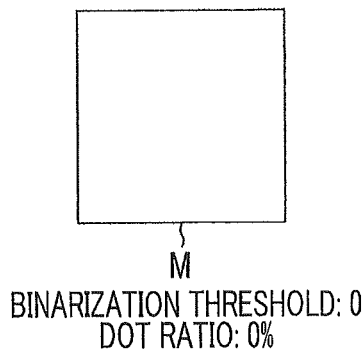
FIG. 10A is a conceptual diagram of a dot pattern representing the relationship between each pixel and a threshold element of a dither matrix shown in FIGS. 9A and 9B.
Figure 10B:
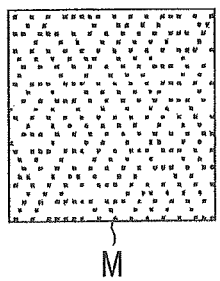
FIG. 10B is a conceptual diagram of a dot pattern representing the relationship between each pixel and a threshold element of a dither matrix shown in FIGS. 9A and 9B.
Figure 10C:
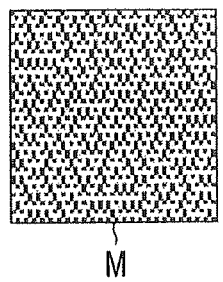
FIG. 10C is a conceptual diagram of a dot pattern representing the relationship between each pixel and a threshold element of a dither matrix shown in FIGS. 9A and 9B.
Figure 10D:
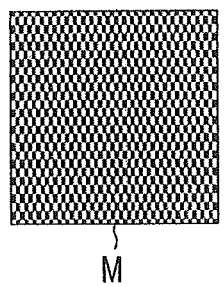
FIG. 10D is a conceptual diagram of a dot pattern representing the relationship between each pixel and a threshold element of a dither matrix shown in FIGS. 9A and 9B.
Figure 10E:
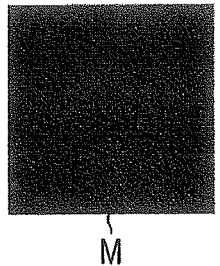
FIG. 10E is a conceptual diagram of a dot pattern representing the relationship between each pixel and a threshold element of a dither matrix shown in FIGS. 9A and 9B.

For example, a maximum value among threshold elements of a dither matrix of FIGS. 7A and 7B and FIGS. 8A to 8H corresponding to a printing mode with high resolution (for example, "1200 dpi×1200 dpi") is "4095", and all dot arrangeable places of a printing mode with low resolution (for example, "1200 dpi×600 dpi") shown in FIGS. 9A and 9B and FIGS. 10A to 10E are shown in FIG. 10D. Then, the halftone dots are arranged at all dot arrangeable places of the low-resolution printing mode with the gradation value of "4094" which is a value lower than "4095" (see FIG. 10D). Accordingly, in the "low resolution printing mode" using the dither matrix shown in FIGS. 9A and 9B and FIGS. 10A to 10E, a halftone image is created by pixels (see FIG. 10D) to which a threshold element substantially equal to or less than "4094" is allocated, and data (see FIG. 10E) of a pixel portion to which a threshold element equal to or greater than "4095" is allocated is not substantially used. In general, in a case where "the numerical range of the threshold element of the dither matrix" and "the range of the pixel value (gradation value) of image data to be processed" are set to be the same, a threshold element having a numerical value equal to or less than the maximum gradation value (for example, "4095" in a 12-bit image, "255" in an 8-bit image) is allocated to all pixels of the dither matrix. However, since the "low resolution printing mode" described above is not "a printing mode (maximum resolution printing mode) in which dots are arranged in all pixels, data (see FIG. 10E) corresponding to at least a gradation (maximum gradation value) where dots are arranged in all pixels" is discarded. In this way, although data for at least one gradation is discarded in the "low resolution printing mode", the influence of data for one gradation discarded in multi-bit (8-bit, 12-bit, or the like) processing is very small, and the influence of data for one gradation in the "low resolution printing mode" is very small.

In a case of "the mode in which a halftone image dot is likely to be on in a pixel corresponding to a pixel of the dither matrix with a threshold element of a large value", in the "low resolution printing mode", data corresponding to at least "a gradation (minimum gradation value) where dots are arranged in all pixels" is discarded.

In this way, a dither matrix is prepared for each printing mode, numerical values or arrangement of threshold elements of each dither matrix are adjusted, and dots of a halftone image are arrangeable only in dot arrangeable pixels in a corresponding printing mode. With this, a dither matrix to be used is switched according to a desired printing mode, whereby it is possible to perform printing with definition (resolution and dot arrangement form) required in the printing mode.

In a case of performing halftone processing according to the image processing flow shown in FIG. 6, among threshold elements constituting the dither matrix according to the high resolution printing mode, a threshold element corresponding to the dot arrangeable place (dot arrangeable pixel) of the low resolution printing mode may be set to be smaller than threshold elements corresponding to other places (pixels). In this case, the dots constituting the halftone image are arranged with priority at the dot arrangeable places of the low resolution printing mode.

In regard to "a form of switching a dither matrix to be used according to a printing mode", as a specific method which simply and reliably realizes halftone processing according to the definition of the printing mode, for example, there is the following execution mode.

<First Execution Mode>

Figure 11:
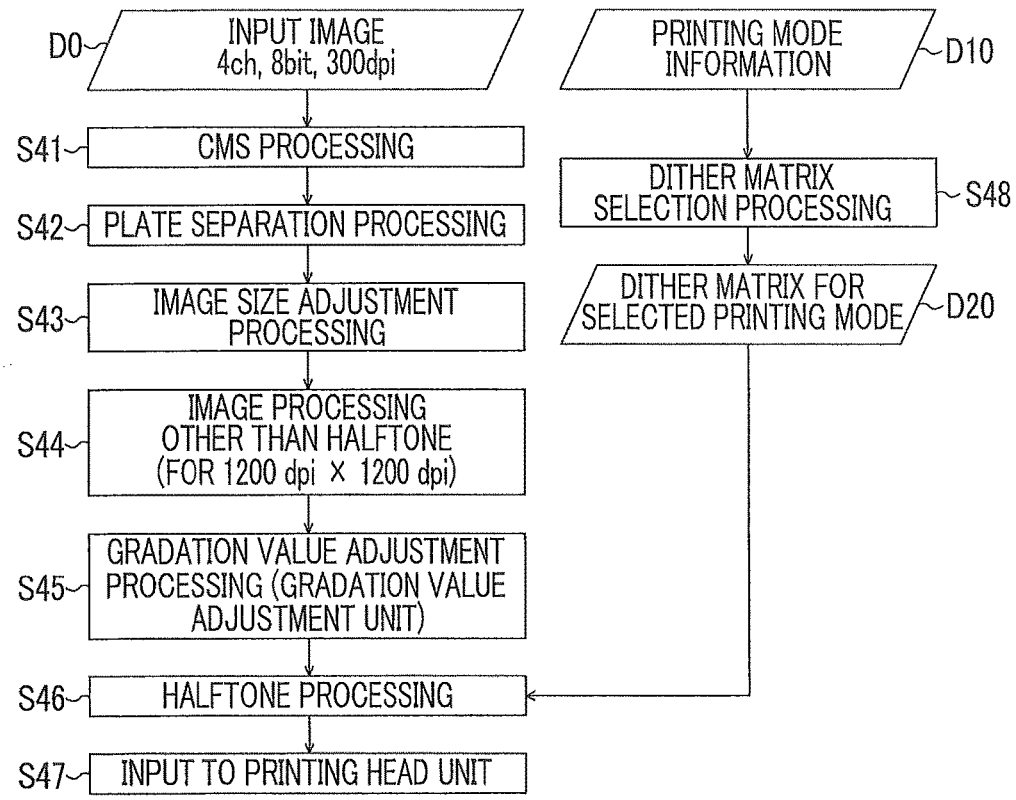
FIG. 11 shows an image processing flow according to a first execution mode.

FIG. 11 shows an image processing flow according to a first execution mode. Respective image processing shown in FIG. 11 is performed primarily by the image processing unit 14 (see FIG. 1).

In this execution mode, similarly to the processing flow of FIG. 6, although CMS processing (S41), plate separation processing (S42), image size adjustment processing (S43), and image processing (S44) other than halftone processing are performed, gradation value adjustment processing (S45) of image data is performed prior to halftone processing (S46). That is, the image processing unit 14 of this execution mode further includes a gradation value adjustment unit which adjusts a gradation value of the input image, and the gradation (pixel value) of image data is adjusted by the gradation value adjustment unit (S45). In the gradation value adjustment processing (S45), for example, gamma correction processing is performed, and the maximum pixel value (maximum gradation value) of image data is changed according to the printing mode. In a case of "the mode in which a halftone image dot is likely to be on in a pixel corresponding to a pixel of the dither matrix with a threshold element of a large value", the minimum pixel value (minimum gradation value) of image data is changed according to the printing mode by the gradation value adjustment processing (S45).

In halftone image data, the dot arrangeable place and the dot arrangement inhibition place are determined according to the printing mode, and for example, in the example shown in FIGS. 2A to 2F, a pixel indicated by a block dot corresponds to the "dot arrangeable place", and a pixel indicated by a white dot corresponds to the "dot arrangement inhibition place". On the other hand, the presence or absence of the halftone image dot in each pixel is determined by comparing the threshold element of each pixel of the dither matrix with the pixel value of image data. For example, if the pixel value of image data is equal to or greater than the threshold element of the corresponding pixel, dot-on can be performed, and if the pixel value of image data is smaller than the threshold element of the corresponding pixel, dot-off can be performed. In this case, in regard to the pixel position of the dot arrangement inhibition place, processing adjustment is performed such that the pixel value of image data is not equal to or greater than the threshold element of the corresponding pixel of the dither matrix, whereby it is possible to simply and reliably generate halftone image data conforming to the definition of the printing mode.

In this execution mode, a value of a threshold element used to determine that the halftone image dots are arranged at all dot arrangeable places according to the printing mode, among the threshold elements constituting the dither matrix, is determined for each printing mode. For example, in a case whether the definition of the printing mode is not the assumed maximum resolution (see FIG. 2A) and includes a dost arrangement inhibition place (see FIGS. 2B to 2F), a threshold element (in a case of 12-bit gradation expression, "4095") of a maximum value can be allocated to the pixel of the dither matrix corresponding to the dot arrangement inhibition place. On the other hand, a threshold element (for example, "0" to "4094") of a value smaller than the maximum value can be allocated to the pixel of the dither matrix corresponding to the dot arrangeable place. In this case, "the value of the threshold element used to determine that the dots are arranged at all dot arrangeable places of the printing mode" may be the maximum value (for example, "4094") among the threshold elements allocated to the pixels corresponding to the dot arrangeable places. In a case where the definition of the printing mode is the assumed maximum resolution (see FIG. 2A) and does not include a dot arrangement inhibition place, a threshold element (in a case of 12-bit gradation expression, "0" to "4095") in an expressible range can be allocated to the pixel of the dither matrix.

In a case of "the mode in which a halftone image dot is likely to be on in a pixel corresponding to a pixel of the dither matrix with a threshold element of a large value", and in a case where the definition of the printing mode is not the assumed maximum resolution and includes a dot arrangement inhibition place, a threshold element of a minimum value can be allocated to the pixel of the dither matrix corresponding to the dot arrangement inhibition place. On the other hand, a threshold element (for example, "1" to "4095") greater than the minimum value can be allocated to the pixel of the dither matrix corresponding to the dot arrangeable place. In this case, "the value of the threshold element used to determine that the dots are arranged at all dot arrangeable places of the printing mode" may be the minimum value (for example, "1") among the threshold elements allocated to the pixels corresponding to the dot arrangeable places.

In this way, the threshold elements of the dither matrix are set for each printing mode, and the threshold elements which are allocated to the pixels corresponding to the dot arrangement inhibition places and the pixels corresponding to the dot arrangeable places are determined. On the other hand, the pixel value of image data is adjusted beforehand by the gradation value adjustment processing S45 prior to the halftone processing S46. That is, the gradation value adjustment unit adjusts the gradation value of the input image such that the input image does not have a gradation value greater than a value of a threshold element used to determine that the dots are arranged at all dot arrangeable places of the selected printing mode, among the threshold elements constituting the dither matrix. That is, at the dot arrangement inhibition place (pixel) based on the printing mode, the pixel value of image data is adjusted to a value smaller than the threshold element of the corresponding pixel of the dither matrix. The halftone processing unit 24 performs the halftone processing S46 on the input image having the gradation value adjusted by the gradation value adjustment unit.

For example, as the value of the threshold element used to determine that the halftone image dots are arranged at all dot arrangeable places, "4095" (12-bit gradation expression) may be set for the high resolution printing mode, and "4094" smaller than the value for the high resolution printing mode may be set for the low resolution printing mode. In this case, the gradation value adjustment unit performs the gradation value adjustment processing (S45) such that, in a case where the high resolution printing mode is selected, each pixel value of the input image does not have a value greater than "4095", and performs the gradation value adjustment processing (S45) such that, in a case where the low resolution printing mode is selected, each pixel value of the input image does not have a value greater than "4094". In this case, in a case where image data to be processed is based on 12-bit data, each pixel value of image data is originally a value equal to or less than "4095"; thus, in a case where the high resolution printing mode is selected, gradation value adjustment is not substantially performed.

With this gradation value adjustment processing (S45), in a case where the low resolution printing mode is selected, each pixel value of image data becomes a numerical value equal to or less than "4094"; thus, the halftone image dot is not arranged in a pixel (dot arrangement inhibition place) to which a threshold element greater than "4094" is allocated.

Specific values and an arrangement form of the threshold elements of the dither matrix may be changed for each printing mode, or may be determined based on image data (pixel value) after the gradation value adjustment processing such that the dot arrangement according to the definition of the selected printing mode is realized.

Halftone image data accurately reflecting the definition of the selected printing mode is created by the gradation value adjustment processing (S45) and the halftone processing (S46) using the dither matrix. In particular, according to this execution mode, it is possible to make the data structure (the number of bits) of the dither matrix of each printing mode common, and to make the structure of the image processing module very simple.

<Second Execution Mode>

In this execution mode, although image processing (halftone processing) is performed by the same flow as the processing flow of FIG. 6, the maximum value of the threshold elements of the dither matrix is adjusted according to the printing mode.

That is, in regard to the pixel position of the dot arrangement inhibition place, the pixel value of image data is avoided from being equal to or greater than the threshold element of the corresponding pixel of the dither matrix, and this execution mode is the same as the above-described first execution mode in that halftone image data according to the printing mode is generated. In the above-described first execution mode, the gradation (pixel value) of image data is adjusted by the gamma correction processing or the like prior to the halftone processing (see S45 of FIG. 11); however, in this execution mode, the threshold element (in particular, the maximum value) of the dither matrix is changed for each printing mode. That is, the dither matrix of each printing mode is determined such that the maximum value of the threshold elements constituting the dither matrix according to the low resolution printing mode becomes greater than the maximum value of the threshold elements constituting the dither matrix according to the high resolution printing mode.

For example, in a case where the maximum value of the threshold elements constituting the dither matrix used in the high resolution printing mode (see FIG. 2A) of "1200 dpi×1200 dpi" is "4095", the maximum value of the threshold elements constituting the dither matrix used in the low resolution printing mode (see FIG. 2B) of "1200 dpi×600 dpi" can be set to "4096" or a numerical value greater than "4096". This is that a value greater than the maximum gradation value of image data is allocated as a threshold element to a pixel of the dither matrix corresponding to a pixel where a dot is not originally arranged with the definition (resolution and dot arrangement form) of the selected printing mode. Even if image data (each pixel value) has any value, a dot is not arranged in a pixel corresponding to a pixel to which a threshold element having a value greater the maximum gradation value of image data is allocated. Accordingly, "a threshold element having a value greater than the maximum gradation value of image data" is allocated to a pixel of the dither matrix corresponding to the dot arrangement inhibition place, whereby it is possible to generate halftone image data according to the definition of the printing mode. In the printing mode with assumed maximum resolution (see FIG. 2A) in which the dot arrangement inhibition place is not provided, the maximum value of the threshold elements of the dither matrix is set to be the same as the maximum gradation value of image data.

In this way, the numerical range (gradation value range, data depth) of the threshold element of the dither matrix is determined for each printing mode, whereby it is possible to create a halftone image accurately reflecting the definition of the selected printing mode.

However, in this execution mode, since the maximum value of the threshold elements of the dither matrix may fluctuate for each printing mode, the data structure (the number of bits) fluctuates among the printing modes, and the data structure of the dither matrix cannot be made common. Accordingly, from a viewpoint of making the data structure of the dither matrix common, the above-described first execution mode is superior to the second execution mode.

Second Embodiment

The halftone processing unit 24 of this embodiment performs halftone processing based on an error diffusion method with an error diffusion coefficient matrix as a processing parameter, and in particular, performs error diffusion processing directly reflecting dot arrangement restraints of each printing mode. The error diffusion processing is a method which performs halftone processing (multi-value processing) while diffusing an error component using the error diffusion coefficient matrix. The error diffusion coefficient matrix has a matrix structure in which an error diffusion coefficient is allocated to each pixel of "P pixels×Q pixels (x direction and y direction; "P" and "Q" are arbitrary integers)". The value of the error diffusion coefficient allocated to each pixel is determined according to an error distribution ratio, and the error diffusion processing is performed by accumulating a product of the error component accompanied by multi-value and the error diffusion coefficient to the pixel value.

In this embodiment, detailed description of the same configuration and action as the above-described first embodiment will not be repeated.

Figure 12:
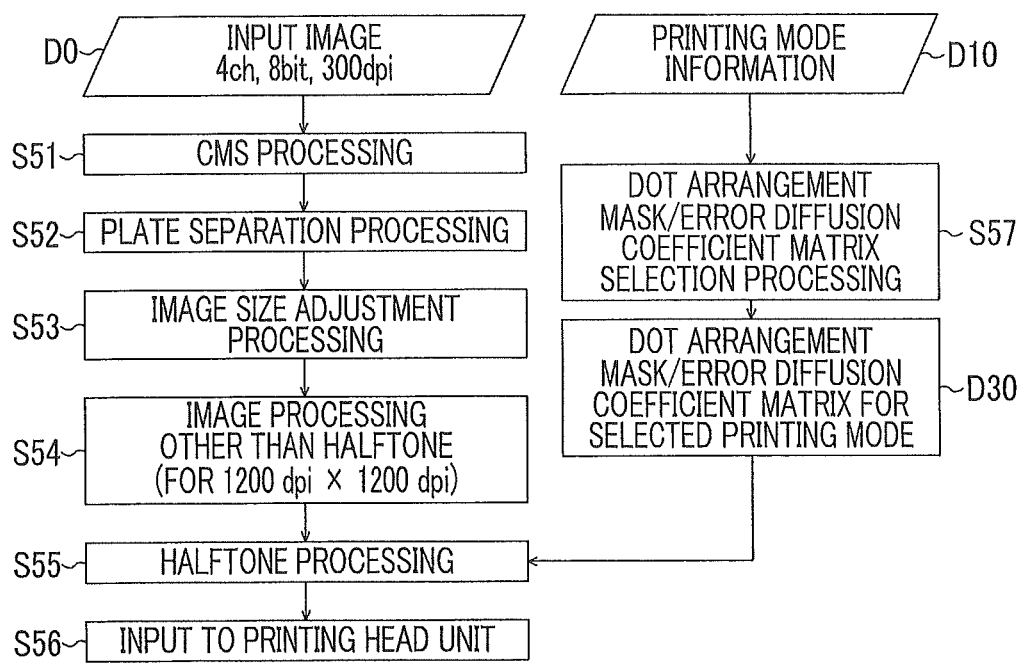
FIG. 12 shows an image processing flow according to a second embodiment.

FIG. 12 shows an image processing flow according to a second embodiment. In this embodiment, similarly to the processing flow shown in FIG. 6, CMS processing (S51 of FIG. 12) and plate separation processing (S52) are performed on input image data D0, the size (resolution) of image data of each process color is adjusted (S53), image processing other than halftone processing and halftone processing are performed (S54, S55), and halftone image data is input to the printing head unit 16 (S56).

However, the halftone processing unit 24 of this embodiment performs selection processing of a dot arrangement mask and an error diffusion coefficient matrix based on printing mode information D10 (S57), and performs halftone processing (S55) using the selected dot arrangement mask and error diffusion coefficient matrix D30.

The dot arrangement mask is mask data which directly or indirectly designates the dot arrangeable place (or dot arrangement inhibition place) of the selected printing mode, and a dot arrangement mask reflecting definition (resolution and dot arrangement form) is prepared for each printing mode.

The halftone processing unit 24 performs the halftone processing (S55) based on the dot arrangement mask corresponding to the selected printing mode and processing parameters (error diffusion coefficient matrix and the like). In this embodiment, as in the above-described first embodiment, the two or more printing modes which are used in the printing apparatus 10 include a relatively high resolution printing mode and a relatively low resolution printing mode, and all dot arrangeable places of the low resolution printing mode are included in the dot arrangeable places of the high resolution printing mode.

In a conventional error diffusion method, it is not possible to place restraints according to the printing mode on the dot arrangement place, an error is distributed to a pixel (dot arrangement inhibition place) where a dot cannot be arranged, and a state where the error stored in the pixel is not eliminated is caused, resulting in an artifact. In this embodiment, the dot arrangement mask is used, the arrangement of the halftone image dots is determined according to the definition of the selected printing mode, and the distribution of the error to the pixel (dot arrangement inhibition place) where a dot cannot be arranged is prevented.

Figure 13:
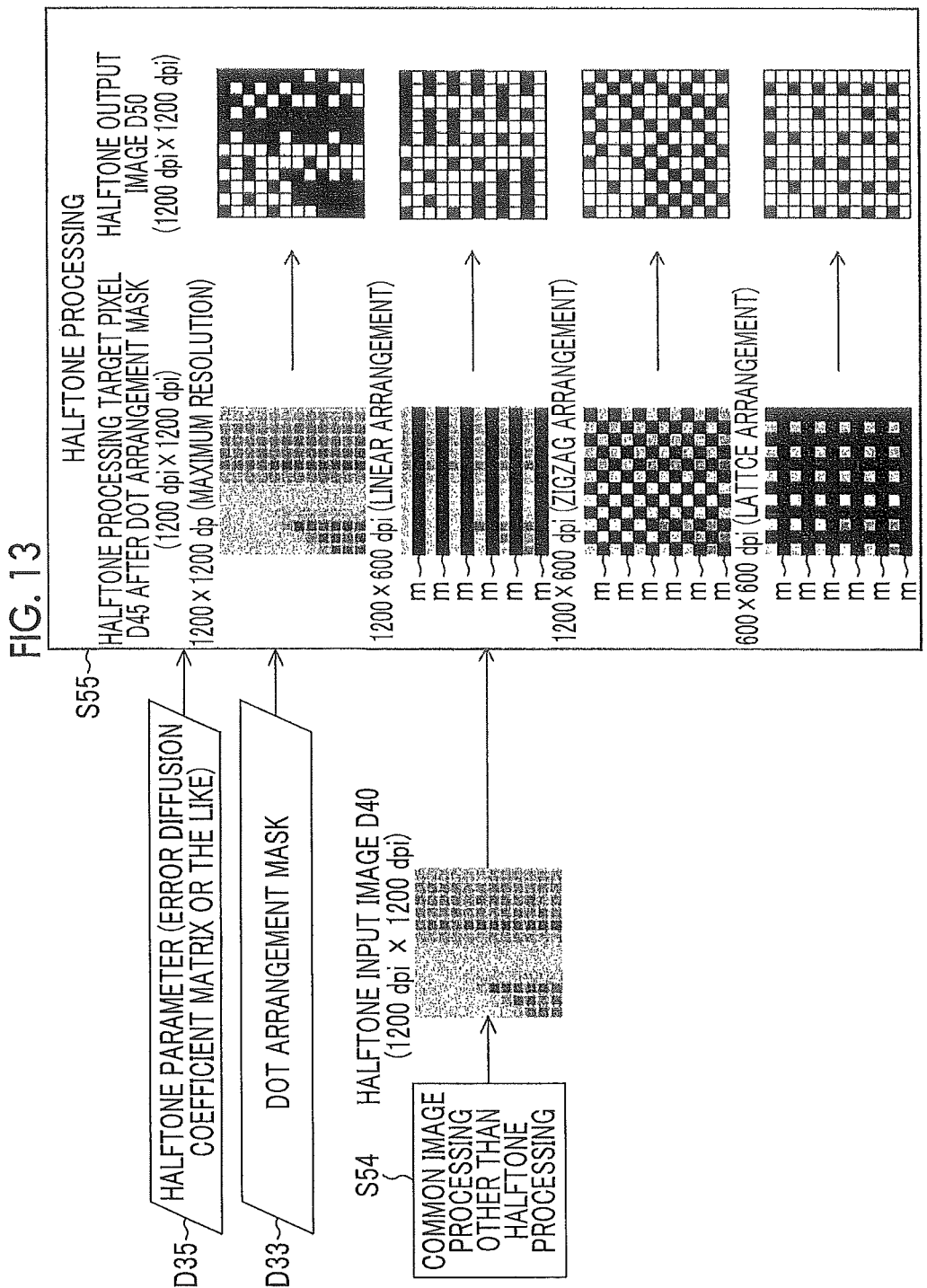
FIG. 13 is a block diagram showing an example of error diffusion method halftone processing.

FIG. 13 is a block diagram showing an example of an error diffusion method halftone processing. The error diffusion method halftone processing of this example applies a dot arrangement mask according to the definition of the selected printing mode to image data to be processed, and binarization processing and error diffusion processing of image data applied with the dot arrangement mask are performed.

That is, in addition to image data (halftone input image D40: for example, "1200 dpi×1200 dpi") subjected to image processing (common image processing S54) other than halftone processing, a halftone parameter D35, such as an error diffusion coefficient matrix, and a dot arrangement mask D33 according to the selected printing mode are input to the halftone processing unit 24. Data of the halftone parameter D35 and the dot arrangement mask D33 is prepared in advance and stored in a storage unit (not shown), and the halftone processing unit 24 accesses the storage unit and acquires data from the storage unit as necessary.

Then, in a memory space corresponding to the definition of the high definition printing mode, the dot arrangement mask D33 selected according to the printing mode and the halftone parameter (error diffusion coefficient matrix) D35 are used to perform the halftone processing S55. In the halftone processing S55, the dot arrangement mask D33 is applied to the halftone input image D40, and the dot arrangeable places are restrained.

That is, in the halftone processing S55, it is determined whether or a pixel of the dot arrangement mask corresponding to a pixel to be processed of image data is on (dot arrangeable place) or off (dot arrangement inhibition place). In a case where the pixel of the dot arrangement mask is on, halftone processing (binarization processing) of the pixel to be processed is performed, and then, determination processing of dot-on/off of the next pixel is performed. In a case where the pixel of the dot arrangement mask is off, the pixel to be processed is set to dot-off, and determination processing of dot-on/off of the next pixel is performed. The dot-on/off determination processing of each pixel based on on/off information of the dot arrangement mask is repeatedly performed for all pixels of image data, and halftone image data is generated.

With this, for example, in a case where the printing mode corresponds to the same resolution as the halftone input image D40, the dot arrangeable places by the dot arrangement mask are not substantially restrained (see "1200 dpi× 1200 dpi (maximum resolution)" of FIG. 13). In a case where the printing mode has lower resolution than the halftone input image D40, a dot-off mask m (dot arrangement mask) is applied to a pixel (dot arrangement inhibition place) with no dot arranged according to the definition of the printing mode. In a pixel to which the dot-off mask m is applied, the pixel value in the halftone image after binarization is set to "0 (zero)", a dot is not arranged (see "halftone output image D50 (1200 dpi×1200 dpi)" of FIG. 13), and an error component is not distributed. A pixel to which the dot-off mask m is not applied is a dot arrangeable place, an error component is distributed, and dot-on/off is determined based on the error diffusion method.

Halftone image data generated on the memory space corresponding to the definition of the high definition printing mode in the above-described manner is transmitted to the printing head unit 16 as it is.

A multi-value (binarization or the like) method of the halftone processing S55 based on the error diffusion method is not particularly limited, "dot-on" can be performed performed if the pixel value of image data is greater than a predetermined threshold (for example, a value (in a case of 12-bit gradation, "2048") which is half the number of gradations of image data), and "dot-off" can be performed if the pixel value of image data is equal to or less than the threshold. The pixel value of image data as the basis of dot-on/off determination is a value after an error from a peripheral pixel is distributed according to the error diffusion coefficient matrix.

In this example, in addition to the above-described dot-on/off determination processing, even in the error distribution processing with the error diffusion method, the dot arrangement mask is used. That is, the halftone processing unit 24 controls error distribution such that an error is distributed only to the dot-on pixel (dot arrangeable place) based on the dot arrangement mask, and an error is not distributed to a dot-off pixel (dot arrangement inhibition pixel).

As a control method of error distribution, there are "a method using a dot arrangement mask separately from an error diffusion coefficient matrix" and "a method using an error diffusion coefficient matrix reflecting an dot arrangement mask".

In "the method using a dot arrangement mask separately from an error diffusion coefficient matrix", the dot arrangement mask is directly used to determine error distribution. That is, the halftone processing unit 24 determines whether a target pixel is a dot arrangeable place (no application of dot-off mask m) or a dot arrangement inhibition place (application of dot-off mask m) during error distribution processing, and does not distribute an error to a pixel where is determined to be a dot arrangement inhibition place.

FIG. 14 shows a program code example according to error diffusion processing using a dot arrangement mask separately from an error diffusion coefficient matrix. Although FIG. 14 shows a program code written in C language, other algorithms or other program languages may be used.

Lines "10" and "20" of FIG. 14 define that processing described in subsequent lines are repeated over all pixels (image height h, image width w) of an input image to be processed. Lines "30" and "40" perform calculation reflecting an error in each pixel value, and add a diffusion error err(i,j) from a peripheral pixel to a pixel value (input image) src[i,j] of a target pixel (i,j) to calculate a pixel value val after reflecting error diffusion. Lines "50" to "70" performs multi-value processing, compare the pixel value val of the target pixel (i,j) with a threshold to determine a dot diameter type k (line "60"), and determine a new diffusion error amount newErr from the difference between the pixel value val and the dot diameter type k (line "70"). Lines "80" to "150" determine an diffusion error amount to a peripheral pixel (i+n,j+m) based on the based diffusion error amount newErr. That is, an error is repeatedly diffused within a range of "0" to "error diffusion coefficient matrix widths edfmatH and edfmatW" (lines "90" and "100"). In a case where the peripheral pixel (i+n,j+m) is a dot arrangeable pixel (mask ON pixel), a new diffusion error amount err[i+n,j+m] is calculated by accumulating the product of the new diffusion error amount newErr and the error diffusion coefficient matrix edfmat[n,m] (lines "120" and "130"). In a case where the peripheral pixel (i+n,j+m) is a dot arrangement inhibition pixel (mask OFF pixel), a diffusion error is not distributed to the peripheral pixel.

As this example, the dot arrangement mask is indirectly used, and an error is not distributed to a pixel where a dot is not placed, whereby it is possible to perform halftone processing using a single error diffusion coefficient matrix in a plurality of printing modes.

In the example shown in FIG. 14, although error diffusion is performed in consideration of the dot arrangement mask prepared separately from the error diffusion coefficient matrix, the error diffusion coefficient matrix reflecting the dot arrangement mask may be used, and error diffusion may be performed without directly using the dot arrangement mask.

FIGS. 15A to 15D are diagrams illustrating an error diffusion coefficient matrix reflecting a dot arrangement mask. In FIGS. 15A to 15D, a pixel notated by "*" is a pixel corresponding to a pixel to be processed, and error diffusion coefficients are allocated to pixels notated by "a" to "1" in English. The error diffusion coefficient allocated to the pixels (dot portions of FIGS. 15A to 15D) notated by "0 (zero)" is "0 (zero)", and an error is not diffused to the pixels corresponding to the pixels to which the error diffusion coefficient of "0" is allocated. In FIGS. 15A to 15D, a hatched pixel corresponds to a processed pixel, and is not subjected to error diffusion.

Figure 15B:
FIG. 15B is a diagram illustrating an error diffusion coefficient matrix reflecting a dot arrangement mask.
Figure 15C:
FIG. 15C is a diagram illustrating an error diffusion coefficient matrix reflecting a dot arrangement mask.
Figure 15D:
FIG. 15D is a diagram illustrating an error diffusion coefficient matrix reflecting a dot arrangement mask.

In this example, an error diffusion coefficient matrix K of FIG. 15A corresponds to a printing mode (1200 dpi×1200 dpi) of FIG. 2A, an error diffusion coefficient matrix of FIG. 15B corresponds to a printing mode (1200 dpi×600 dpi (linear arrangement)) of FIG. 2B, an error diffusion coefficient matrix of FIG. 15C corresponds to a printing mode (1200 dpi×600 dpi (zigzag arrangement)) of FIG. 2C, and an error diffusion coefficient matrix of FIG. 15D corresponds to a printing mode (600 dpi×600 dpi (lattice arrangement)) of FIG. 2D.

The error diffusion coefficient matrix K shown in FIGS. 15A to 15D takes the dot arrangeable place (dot arrangement mask) in the corresponding printing mode into consideration, and the error diffusion coefficient of "0" is allocated to the corresponding pixel such that an error is not diffused to a pixel (dot arrangement inhibition place) where a dot is not arranged.

The error diffusion coefficient matrixes shown in FIGS. 15A to 15D are prepared in advance for each printing mode, and the halftone processing unit 24 selects and uses the corresponding error diffusion coefficient matrix according to the selected printing mode, whereby it is possible to perform error diffusion according to the definition of the printing mode. In the relationship of definition (resolution and dot arrangement form) of a plurality of printing modes, one error diffusion coefficient matrix may be used as a reference, and an error diffusion coefficient matrix created by extending the reference error diffusion coefficient matrix according to the definition of the printing mode, or the like may be used in halftone processing.

FIG. 16 shows a program code example according to error diffusion processing using an error diffusion coefficient matrix reflecting a dot arrangement mask. In FIG. 16, detailed description of the same processing as in FIG. 14 will be omitted. As in the processing of FIG. 14, it is defined that the error diffusion processing of this example is repeatedly performed over all pixels of the input image to be processed (lines "10" and "20" of FIG. 16), calculation processing reflecting an error (lines "30" and "40"), multi-value processing and calculation processing of a new error amount newErr (lines "50" to "70"), and error diffusion processing (lines "80" to "110") are performed. In the error diffusion processing of this example, since on/off information (definition information of the printing mode) of the dot arrangement mask is reflected in the error diffusion coefficient matrix, "determination of a mask ON pixel (see lines "110" to "130" of FIG. 14)" is not required.

As described above, as the error diffusion method, there are "the method which uses a dot arrangement mask separately from an error diffusion coefficient matrix (see FIG. 14: error diffusion method α)", and "the method (see FIGS. 15A to 16: error diffusion method β-1) which reflects a dot arrangement mask in an error diffusion coefficient matrix and which prepares an error diffusion coefficient matrix for each printing mode", and "the method (error diffusion method β-2) which reflects a dot arrangement mask in an error diffusion coefficient matrix and which expands and modifies an error diffusion coefficient matrix as the reference for each printing mode". From a viewpoint of image quality, the error diffusion method β-1 and the error diffusion method β-2 are preferably used rather than the error diffusion method α, and from a viewpoint of improving quality of granulation of a printing image, the error diffusion method β-1 is preferably used rather than the error diffusion method β-2.

Modification Examples

If image processing is made common in the printing modes, in regard to image processing of the printing modes (in particular, a printing mode with relative low density (low resolution)) made common, image processing is performed in a higher density data state, and the processing rate itself is decreased. For this reason, it is not necessary to make image processing common in all printing modes, and for example, it is preferable to provide a dedicated image processing module in a printing mode which is considered that the use frequency of the user is high.

The respective configurations and functions described above can be appropriately realized by arbitrary hardware, software, or a combination thereof. For example, the invention can be applied to a program which causes a computer to execute the above-described processing steps (processing procedures), a computer-readable recording medium (non-transitory recording medium) having the program recorded thereon, or a computer on which the program can be installed.

EXPLANATION OF REFERENCES

10: printing apparatus, 12: printing condition setting unit, 14: image processing unit, 16: printing head unit, 20: image size adjustment unit, 22: image adjustment processing unit, 24: halftone processing unit

What is claimed is:

1. An image processing device which generates a halftone image from an input image of a plurality of printing modes with different definition, the image processing device comprising:
   an image size adjustment unit which adjusts a size of the input image; and
   a halftone processing unit which performs halftone processing on the input image size-adjusted by the image size adjustment unit to generate a halftone image, wherein:
   the image size adjustment unit adjusts the input image to a same size in two or more printing modes among the plurality of printing modes, and the input image of the same size is subjected to the halftone processing;
   the halftone processing unit limits arrangement of dots constituting the halftone image to dot arrangeable places of a selected printing mode among the plurality of printing modes, and performs the halftone processing based on an error diffusion method using an error diffusion coefficient matrix according to the selected printing mode, while controlling error distribution such that an error component is distributed only to the dot arrangeable places of the selected printing mode; and
   the functions performed by the image size adjustment unit and the halftone processing unit are achieved using a computer.

2. The image processing device according to claim 1, wherein the halftone processing unit performs the halftone processing while using a dot arrangement mask which designates the dot arrangeable places of the selected printing mode.

3. The image processing device according to claim 2, wherein the dot arrangement mask is reflected in the error diffusion coefficient matrix, and the halftone processing unit uses the error diffusion coefficient matrix reflecting the dot arrangement mask to determine the error distribution.

4. The image processing device according to claim 3, wherein the error diffusion coefficient matrix is prepared for each of the plurality of printing modes, and the halftone processing unit selects and uses the error diffusion coefficient matrix according to the selected printing mode.

5. The image processing device according to claim 3, wherein a reference error diffusion coefficient matrix is prepared, and the halftone processing unit creates and uses the error diffusion coefficient according to the selected printing mode by expanding and modifying the reference error diffusion coefficient matrix according to the selected printing mode.

6. The image processing device according to claim 2, wherein the dot arrangement mask is prepared separately from the error diffusion coefficient matrix, and the halftone processing unit directly uses the dot arrangement mask to determine the error distribution.

7. The image processing device according to claim 1, wherein the two or more printing modes include a relatively high resolution printing mode and a relatively low resolution printing mode, and all of the dot arrangeable places of the low resolution printing mode are included in the dot arrangeable places of the high resolution printing mode.

8. An image processing device which generates a halftone image from an input image of a plurality of printing modes with different definition, the image processing device comprising:
an image size adjustment unit which adjusts a size of the input image; and
a halftone processing unit which performs halftone processing on the input image size-adjusted by the image size adjustment unit to generate a halftone image, wherein:
the image size adjustment unit adjusts the input image to a same size in two or more printing modes among the plurality of printing modes, and the input image of the same size is subjected to the halftone processing;
the halftone processing unit limits arrangement of dots constituting the halftone image to dot arrangeable places of a selected printing mode among the plurality of printing modes, and performs the halftone processing based on an error diffusion method using an error diffusion coefficient matrix according to the selected printing mode, while controlling error distribution such that an error component is not distributed to dot arrangement inhibition places of the selected printing mode; and
the functions performed by the image size adjustment unit and the halftone processing unit are achieved using a computer.

9. The image processing device according to claim 8, wherein the halftone processing unit performs the halftone processing while using a dot arrangement mask which designates the dot arrangeable places and the dot arrangement inhibition places of the selected printing mode.

10. The image processing device according to claim 9, wherein the dot arrangement mask is reflected in the error diffusion coefficient matrix, and the halftone processing unit uses the error diffusion coefficient matrix reflecting the dot arrangement mask to determine the error distribution.

11. The image processing device according to claim 10, wherein the error diffusion coefficient matrix is prepared for each of the plurality of printing modes, and the halftone processing unit selects and uses the error diffusion coefficient matrix according to the selected printing mode.

12. The image processing device according to claim 10, wherein a reference error diffusion coefficient matrix is prepared, and the halftone processing unit creates and uses the error diffusion coefficient according to the selected printing mode by expanding and modifying the reference error diffusion coefficient matrix according to the selected printing mode.

13. The image processing device according to claim 9, wherein the dot arrangement mask is prepared separately from the error diffusion coefficient matrix, and the halftone processing unit directly uses the dot arrangement mask to determine the error distribution.

14. The image processing device according to claim 8, wherein the two or more printing modes include a relatively high resolution printing mode and a relatively low resolution printing mode, and all of the dot arrangeable places of the low resolution printing mode are included in the dot arrangeable places of the high resolution printing mode.

15. An image processing device which generates a halftone image from an input image of a plurality of printing modes with different definition, the image processing device comprising:
an image size adjustment unit which adjusts a size of the input image; and
a halftone processing unit which performs halftone processing on the input image size-adjusted by the image size adjustment unit to generate a halftone image, wherein:
the image size adjustment unit adjusts the input image to a same size in two or more printing modes among the plurality of printing modes, and the input image of the same size is subjected to the halftone processing;
the halftone processing unit limits arrangement of dots constituting the halftone image to dot arrangeable places of a selected printing mode among the plurality of printing modes, and performs the halftone processing based on an error diffusion method using an error diffusion coefficient matrix according to the selected printing mode, while using a dot arrangement mask which designates the dot arrangeable places of the selected printing mode;
the dot arrangement mask is reflected in the error diffusion coefficient matrix, and the halftone processing unit uses the error diffusion coefficient matrix reflecting the dot arrangement mask to determine error distribution; and
the functions performed by the image size adjustment unit and the halftone processing unit are achieved using a computer.

16. The image processing device according to claim 15, wherein the error diffusion coefficient matrix is prepared for each of the plurality of printing modes, and the halftone processing unit selects and uses the error diffusion coefficient matrix according to the selected printing mode.

17. The image processing device according to claim 15, wherein a reference error diffusion coefficient matrix is prepared, and the halftone processing unit creates and uses the error diffusion coefficient according to the selected printing mode by expanding and modifying the reference error diffusion coefficient matrix according to the selected printing mode.

18. The image processing device according to claim 15, wherein the two or more printing modes include a relatively high resolution printing mode and a relatively low resolution printing mode, and all of the dot arrangeable places of the low resolution printing mode are included in the dot arrangeable places of the high resolution printing mode.

19. An image processing device which generates a halftone image from an input image of a plurality of printing modes with different definition, the image processing device comprising:
an image size adjustment unit which adjusts a size of the input image; and
a halftone processing unit which performs halftone processing on the input image size-adjusted by the image size adjustment unit to generate a halftone image, wherein:

the image size adjustment unit adjusts the input image to a same size in two or more printing modes among the plurality of printing modes, and the input image of the same size is subjected to the halftone processing;

the halftone processing unit limits arrangement of dots constituting the halftone image to dot arrangeable places of a selected printing mode among the plurality of printing modes, and performs the halftone processing based on an error diffusion method using an error diffusion coefficient matrix according to the selected printing mode, while using a dot arrangement mask which designates the dot arrangeable places of the selected printing mode;

the dot arrangement mask is prepared separately from the error diffusion coefficient matrix, and the halftone processing unit directly uses the dot arrangement mask to determine error distribution; and the functions performed by the image size adjustment unit and the halftone processing unit are achieved using a computer.

20. The image processing device according to claim 19, wherein the two or more printing modes include a relatively high resolution printing mode and a relatively low resolution printing mode, and all of the dot arrangeable places of the low resolution printing mode are included in the dot arrangeable places of the high resolution printing mode.

* * * * *